US012750334B2

(12) United States Patent
Chen et al.

(10) Patent No.: US 12,750,334 B2
(45) Date of Patent: Sep. 29, 2026

(54) COMMUNICATION METHOD AND APPARATUS, AND COMPUTER-READABLE STORAGE MEDIUM

(71) Applicant: HUAWEI TECHNOLOGIES CO., LTD., Shenzhen (CN)

(72) Inventors: Zehao Chen, Beijing (CN); Yongcui Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 18/312,640

(22) Filed: May 5, 2023

(65) Prior Publication Data

US 2023/0275872 A1 Aug. 31, 2023

Related U.S. Application Data

(63) Continuation of application No. PCT/CN2020/127592, filed on Nov. 9, 2020.

(51) Int. Cl.
*H04L 61/4511* (2022.01)
*H04W 28/02* (2009.01)

(52) U.S. Cl.
CPC ..... *H04L 61/4511* (2022.05); *H04W 28/0205* (2013.01)

(58) Field of Classification Search
CPC ....................... H04L 61/4511; H04W 28/0205
See application file for complete search history.

(56) References Cited

U.S. PATENT DOCUMENTS

2019/0357298 A1* 11/2019 Li ......................... H04W 24/02
2020/0120446 A1* 4/2020 Stammers ............. H04W 4/029
2023/0354149 A1* 11/2023 Xu ...................... H04W 40/246

FOREIGN PATENT DOCUMENTS

CN 109729181 A 5/2019
CN 110535930 A 12/2019
(Continued)

OTHER PUBLICATIONS

"3rd Generation Partnership Project; Technical Specification Group Services and System Aspects; Study on enhancement of support for Edge computing in 5G Core network (5GC)(Release 17)," Oct. 2020. (Year: 2020).*

(Continued)

*Primary Examiner* — Andrew C Georgandellis
(74) *Attorney, Agent, or Firm* — HAUPTMAN HAM, LLP

(57) ABSTRACT

A communication method and apparatus, and a computer-readable storage medium. First request information is received from a terminal device, where the first request information includes first application identification information. Second information is determined based on the first application identification information and first information obtained from a session management function network element, where the second information includes extended mechanisms for DNS client subnet option or address information of a local DNS resolver. DNS request information is sent to a central DNS server or the local DNS resolver based on the second information, where the DNS request information includes the first application identification information, and the DNS request information is usable to obtain address information of an application server.

17 Claims, 10 Drawing Sheets

(56) References Cited

FOREIGN PATENT DOCUMENTS

| | | | |
|---|---|---|---|
| CN | 111385369 | A | 7/2020 |
| WO | 2020018012 | A1 | 1/2020 |
| WO | 2020207490 | A1 | 10/2020 |

OTHER PUBLICATIONS

China Mobile, Key issue1 : A merged solution of session breakout scenario with UPF based for key issue1. 3GPP TSG-SA WG2 Meeting #140E, Aug. 19-Sep. 2, 2020, Electronic, S2-2005193, 8 pages.
Extended European Search Report issued in corresponding European Application No. 20960505.4, dated Sep. 28, 2023, pp. 1-10.
Tencent KI# 1 Sol #3 6: Update to Clarify DNS Handling, S2-2004159 SA WG2 Meeting #139E (e-meeting) , Dec. 6, 2020,total 7 pages.
3GPP TS 23.503 V16.6.0 :"3rd Generation Partnership Project; Technical Specification Group Services and System Aspects;Policy and charging control framework for the5G System (5GS);Stage 2(Release 16)",Sep. 2020,total 118 pages.
3GPP TR 23.748 V1.1.0 (Oct. 2020), 3rd Generation Partnership Project; Technical Specification Group Services and System Aspects; Study on enhancement of support for Edge Computingin 5G Core network (5GC) (Release 17), 243 pages.
J. Damas et al, Extension Mechanisms for DNS (EDNS(0)), rfc6891,Apr. 2013, total 16 pages.
C. Contavalli et al, Client Subnet in DNS Queries, rfc7871,May 2016, total 30 pages.
International Search Report issued in corresponding International Application No. PCT/CN2020/127592, mailed Jul. 29, 2021, pp. 1-9.

* cited by examiner

COMMUNICATION METHOD AND APPARATUS, AND COMPUTER-READABLE STORAGE MEDIUM

CROSS-REFERENCE TO RELATED APPLICATIONS

This application is a continuation of International Application No. PCT/CN2020/127592, filed on Nov. 9, 2020, the disclosure of which is hereby incorporated by reference in its entirety.

BACKGROUND

Edge computing (edge computing, EC) may implement local processing of distributed service traffic by moving a user plane function (user plane function, UPF) network element and a service processing capability downward to a network edge. A plurality of edge application servers (edge application servers, EASs) deployed at the network edge may serve a same service. These EASs provide same content for this service, but may have different internet protocol (internet protocol, IP) addresses. In response to a terminal device needing to access the service, the terminal device needs to access an available EAS nearest to the terminal device. Therefore, in response to in response to the terminal device having a service requirement, in response to address information of the EAS needing to be determined, the terminal device needs to obtain, from a session management function (session management function, SMF) network element, information associated with a current location of the terminal device. Different SMF network elements serve a large quantity of terminal devices, and each terminal device has a different service requirement. Therefore, massive communication is performed between the SMF network element and the terminal devices, and a large amount of information needs to be transmitted. As a result, a waste of communication resources is caused.

SUMMARY

Embodiments described herein disclose a communication method and apparatus, and a computer-readable storage medium, to save transmission resources.

According to a first aspect, a communication method is disclosed. The communication method is applied to a first entity, or is applied to a module (for example, a chip) in the first entity. The following uses the first entity as an example for description. The communication method includes: receiving first request information from a terminal device, where the first request information includes first application identification information; determining second information based on the first application identification information and first information obtained from a session network function network element, where the second information is client subnet option extended mechanisms for DNS (extended mechanisms for DNS, EDNS) client subnet option (EDNS client subnet option, ECS option) or address information of a local domain name system (domain name system, DNS) resolver; and sending DNS request information to a central DNS server or the local DNS resolver based on the second information, where the DNS request information includes the first application identification information, and the DNS request information is used to obtain address information of an application server.

In at least one embodiment, after receiving request information that is from the terminal device and that includes application identification information, the first entity determines the second information based on the first application identification information and the first information obtained from the session network function network element, and send the DNS request information to the central DNS server or the local DNS resolver based on the second information. In response to the first entity having obtained the first information from the session management function network element before receiving the request information, the first entity does not need to obtain the second information from the session management function network element after receiving the request information. Therefore, the second information does not need to be obtained from the session management function network element each time the request information that is from the terminal device and that includes the application identification information is received, so that a quantity of times of communication between the first entity and the session management function network element is reduced, thereby saving transmission resources. In addition, after receiving the request information from the terminal device, the first entity reduces a processing delay of the DNS request information without interacting with the session network function network element.

In at least one embodiment, the communication method further includes: receiving the first information from the session management function network element, where the first information includes the first application identification information and the second information corresponding to the first application identification information.

In at least one embodiment, the first information is actively sent by the session management function network element to the first entity. Therefore, the first entity does not send, to the session management function network element, a request used to obtain the first information, so that a quantity of times of communication between the first entity and the session network function network element is further reduced, thereby saving transmission resources. In addition, the first information includes at least the first application identification information and the second information corresponding to the first application identification information, so that the second information is determined based on the first information and the first application identification information.

In at least one embodiment, the communication method further includes: receiving the first information from the session management function network element, where the first information includes the first application identification information, a first identifier, and the second information corresponding to the first application identification information and the first identifier, where the first identifier is at least one data network access identifier (data network access identifier, DNAI).

In at least one embodiment, the first information is actively sent by the session management function network element to the first entity. Therefore, the first entity does not send, to the session management function network element, a request used to obtain the first information, so that a quantity of times of communication between the first entity and the session network function network element is further reduced, thereby saving transmission resources. In addition, the first information includes at least the first application identification information, the at least one data network access identifier, and the second information corresponding to the first application identification information and the data network access identifier, so that the second information is determined based on the first information and the first application identification information.

In at least one embodiment, the communication method further includes: receiving a second identifier from the session management function network element, where the second identifier is a data network access identifier corresponding to a current location of the terminal device. That the first entity determines second information based on the first application identification information and first information obtained from a session network function network element includes: determining the second information based on the first application identification information, the second identifier, and the first information obtained from the session network function network element.

In at least one embodiment, the session network function network element actively sends, to the first entity, the data network access identifier corresponding to the current location of the terminal device, so that the first entity determines the second information based on the first application identification information, the data network access identifier corresponding to the current location of the terminal device, and the first information.

In at least one embodiment, before the first entity receives the first information from the session management function network element, the communication method further includes: sending the first application identification information and/or first indication information to the session management function network element, where the first application identification information is used to obtain the first information, and the first indication information indicates the session management function network element to send the first information.

In at least one embodiment, the first entity first sends, to the session management function network element, information used to obtain the first information, so that the session network function network element sends the first information to the first entity based on the information. The first information is sent by the session management function network element to the first entity only in response to in response to the first entity needing the first information.

In at least one embodiment, the first information further includes a third identifier, the first identifier, and third information corresponding to the first identifier and the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, in addition to the first application identification information, the at least one data network access identifier, and the second information corresponding to the first application identification information and the data network access identifier, the first information further includes the third identifier, the first identifier, and the third information corresponding to the first identifier and the third identifier, so that in response to the first entity subsequently receiving other request information including application identification information from the terminal device, a quantity of times of obtaining the first information from the session management function network element is reduced, and a quantity of times of communication between the first entity and the session network function network element is reduced, thereby saving transmission resources. In addition, after receiving the request information from the terminal device, the first entity reduces a processing delay of the DNS request information without interacting with the session network function network element.

In at least one embodiment, the first information further includes a third identifier and third information corresponding to the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, in addition to the first application identification information and the second information corresponding to the first application identification information, the first information further includes the third identifier and the third information corresponding to the third identifier, so that in response to the first entity subsequently receiving other request information including application identification information from the terminal device, a quantity of times of obtaining the first information from the session management function network element is reduced, and a quantity of times of communication between the first entity and the session network function network element is reduced, thereby saving transmission resources. In addition, after receiving the request information from the terminal device, the first entity reduces a processing delay of the DNS request information without interacting with the session network function network element.

In at least one embodiment, the communication method further includes: receiving second indication information and a fourth identifier from the session management function network element, where the fourth identifier is a data network access identifier of a data network that no longer serves the terminal device, and the first identifier includes the fourth identifier; and deleting, based on the second indication information, information corresponding to the fourth identifier from the first information.

In at least one embodiment, the first entity deletes a part or all of the first information based on an indication of the session management function network element, so that stored information is reduced, storage space is saved, and a time used by the first entity to determine the second information is reduced, thereby reducing a processing delay of the DNS request information.

In at least one embodiment, that the first entity receives second indication information and a fourth identifier from the session management function network element includes: receiving the second indication information, the fourth identifier, and a fifth identifier from the session management function network element, where the fifth identifier is application identification information of an application deployed on a data network corresponding to the fourth identifier. That the first entity deletes information corresponding to the fourth identifier from the first information includes: deleting information corresponding to the fourth identifier and the fifth identifier from the first information.

In at least one embodiment, that the first entity sends DNS request information to a central DNS server or the local DNS resolver based on the second information includes: in response to the second information being the extended mechanisms for DNS client subnet option, sending the DNS request information to the central DNS server, where the DNS request further includes the second information; or in response to the second information being the address information of the local DNS resolver, sending the DNS request information to the local DNS resolver.

According to a second aspect, a communication method is disclosed. The communication method is applied to a session management function network element, or is applied to a module (for example, a chip) in the session management function network element. The following uses the session management function network element as an example for description. The communication method includes: sending first information to a first entity, where the first information includes first application identification information and second information corresponding to the first application identification information, or includes first application identification information, a first identifier, and second information corresponding to the first application identification information and the first identifier, where the first identifier is at least one data network access identifier, the second information is extended mechanisms for DNS client subnet option or address information of a local DNS resolver, and the first information is used by the first entity to determine the second information.

In at least one embodiment, the session management function network element actively sends the first information to the first entity, so that after receiving request information that is from a terminal device and that includes application identification information, the first entity determines the second information based on the first application identification information and the first information, and send DNS request information to a central DNS server or the local DNS resolver based on the second information. This prevents the first entity from obtaining the second information from the session management function network element each time after receiving the request information that is from the terminal device and that includes the application identification information, so that a quantity of times of communication between the first entity and the session management function network element is reduced, thereby saving transmission resources. In addition, after receiving the request information from the terminal device, the first entity reduces a processing delay of the DNS request information without interacting with the session network function network element.

In at least one embodiment, the communication method further includes: sending a second identifier to the first entity, where the second identifier is a data network access identifier corresponding to a current location of the terminal device. That the first information is used to determine the second information includes: the first information and the second identifier are used to determine the second information.

In at least one embodiment, the session management function network element actively sends, to the first entity, the data network access identifier corresponding to the current location of the terminal device, so that the first entity determines the second information based on the first application identification information, the data network access identifier corresponding to the current location of the terminal device, and the first information.

In at least one embodiment, the communication method further includes: receiving the first application identification information and/or first indication information from the first entity. That the session management function network element sends first information to a first entity includes: sending the first information to the first entity based on the first application identification information and/or the first indication information.

In at least one embodiment, the session management function network element sends the first information to the first entity only after receiving information used to obtain the first information from the first entity. The first information is sent by the session management function network element to the first entity in response to the first entity needing the first information.

In at least one embodiment, the first information further includes a third identifier, the first identifier, and third information corresponding to the first identifier and the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, in addition to the first application identification information, the at least one data network access identifier, and the second information corresponding to the first application identification information and the data network access identifier, the first information further includes the third identifier, the first identifier, and the third information corresponding to the first identifier and the third identifier, so that in response to the first entity subsequently receiving request information including other application identification information from the terminal device, a quantity of times of obtaining the first information from the session management function network element is reduced, and a quantity of times of communication between the session management function network element and the first entity is reduced, thereby saving transmission resources. In addition, after receiving the request information from the terminal device, the first entity reduces a processing delay of the DNS request information without interacting with the session network function network element.

In at least one embodiment, the first information further includes a third identifier and third information corresponding to the third identifier. The third identifier is application identification information of an application deployed on a data network corresponding to the first identifier. The third information is an extended mechanisms for DNS client subnet option corresponding to the third identifier or address information of a local DNS resolver corresponding to the third identifier.

In at least one embodiment, in addition to the first application identification information and the second information corresponding to the first application identification information, the first information further includes the third identifier and the third information corresponding to the third identifier, so that in response to the first entity subsequently receiving other request information including application identification information from the terminal device, a quantity of times of obtaining the first information from the session management function network element is reduced, and a quantity of times of communication between the session management function network element and the first entity is reduced, thereby saving transmission resources. In addition, after receiving the request information from the terminal device, the first entity reduces a processing delay of the DNS request information without interacting with the session network function network element.

In at least one embodiment, the communication method further includes: sending second indication information and a fourth identifier to the first entity, where the fourth identifier is a data network access identifier of a data network that no longer serves the terminal device, the first identifier includes the fourth identifier, and the second indication information is used to delete information corresponding to the fourth identifier from the first information.

In at least one embodiment, the session management function network element sends, to the first entity, indication information used to delete information, so that the first entity deletes a part or all of the first information based on an indication of the session management function network element. This reduces information stored in the first entity, save storage space of the first entity, and reduce a time used by the first entity to determine the second information, so that a processing delay of the DNS request information is reduced.

In at least one embodiment, that the session management function network element sends second indication information and a fourth identifier to the first entity includes: sending the second indication information, the fourth identifier, and a fifth identifier to the first entity, where the fifth identifier is application identification information of an application deployed on a data network corresponding to the fourth identifier. That the second indication information is used to delete information corresponding to the fourth identifier from the first information includes: the second indication information is used to delete information corresponding to the fourth identifier and the fifth identifier from the first information.

According to a third aspect, a communication method is disclosed. The communication method is applied to a first entity, or is applied to a module (for example, a chip) in the first entity. The following uses the first entity as an example for description. The communication method includes: receiving first request information from a terminal device, where the first request information includes first application identification information; determining second information based on first information obtained from a session management function network element, where the second information is an extended mechanisms for DNS client subnet option corresponding to a first identifier or address information of a local DNS resolver corresponding to a first identifier, the first identifier is a data network access identifier of a data network with a smallest service scope or closest to the terminal device in data networks corresponding to a second identifier, and the second identifier is at least one data network access identifier corresponding to a current location of the terminal device; and sending DNS request information to a central DNS server or the local DNS resolver based on the second information, where the DNS request information includes the first application identification information, and the DNS request information is used to obtain address information of an application server.

In at least one embodiment, after receiving request information that is from the terminal device and that includes application identification information, the first entity determines the second information based on the first information obtained from the session network function network element, and send the DNS request information to the central DNS server or the local DNS resolver based on the second information. In response to the first entity having obtained the first information from the session management function network element before receiving the request information, and determines the second information based on the first information, the first entity does not need to obtain the second information from the session management function network element after receiving the request information. Therefore, the second information does not need to be obtained from the session management function network element each time the request information that is from the terminal device and that includes the application identification information is received, so that a quantity of times of communication between the first entity and the session management function network element is reduced, thereby saving transmission resources. In addition, after receiving the request information from the terminal device, the first entity reduces a processing delay of the DNS request information without interacting with the session network function network element.

In at least one embodiment, the communication method further includes: receiving the first information from the session management function network element, where the first information includes includes the second information.

In at least one embodiment, the first information is actively sent by the session management function network element to the first entity. Therefore, the first entity does not send, to the session management function network element, a request used to obtain the first information, so that a quantity of times of communication between the first entity and the session network function network element is further reduced, thereby saving transmission resources. In addition, the first information includes at least the second information, so that the second information is determined based on the first information.

In at least one embodiment, the communication method further includes: receiving the first information from the session management function network element, where the first information includes the first application identification information and the second information corresponding to the first application identification information.

In at least one embodiment, the first information is actively sent by the session management function network element to the first entity. Therefore, the first entity does not send, to the session management function network element, a request used to obtain the first information, so that a quantity of times of communication between the first entity and the session network function network element is further reduced, thereby saving transmission resources. In addition, the first information includes at least the first application identification information and the second information corresponding to the first application identification information, so that the second information is determined based on the first information.

In at least one embodiment, the first information further includes a third identifier and third information corresponding to the third identifier. The third identifier is application identification information of an application deployed on a data network corresponding to the second identifier. The third information is an extended mechanisms for DNS client subnet option corresponding to the third identifier or address information of a local DNS resolver corresponding to the third identifier.

In at least one embodiment, in addition to the first application identification information and the second information corresponding to the first application identification information, the first information further includes the third identifier and the third information corresponding to the third identifier, so that in response to the first entity subsequently receiving other request information including application identification information from the terminal device, a quantity of times of obtaining the first information from the session management function network element is reduced, and a quantity of times of communication between the first entity and the session network function network element is reduced, thereby saving transmission resources. In addition, after receiving the request information from the terminal device, the first entity reduces a processing delay of the DNS request information without interacting with the session network function network element.

In at least one embodiment, the communication method further includes: sending the first application identification information and/or first indication information to the session management function network element, where the first application identification information is used to obtain the first information, and the first indication information indicates the session management function network element to send the first information.

In at least one embodiment, the first entity first sends, to the session management function network element, information used to obtain the first information, so that the session network function network element sends the first information to the first entity based on the information. The first information is sent by the session management function network element to the first entity only in response to the first entity needing the first information.

In at least one embodiment, the communication method further includes: receiving second indication information from the session management function network element, where the second indication information indicates to delete the first information; and deleting the first information based on the second indication information.

In at least one embodiment, the first entity deletes the first information based on an indication of the session management function network element, so that stored information is reduced, and storage space is saved.

In at least one embodiment, that the first entity sends DNS request information to a central DNS server or the local DNS resolver based on the second information includes: in response to the second information being the extended mechanisms for DNS client subnet option, sending the DNS request information to the central DNS server, where the DNS request further includes the second information; or in response to the second information being the address information of the local DNS resolver, sending the DNS request information to the local DNS resolver.

According to a fourth aspect, a communication method is disclosed. The communication method is applied to a session management function network element, or is applied to a module (for example, a chip) in the session management function network element. The following uses the session management function network element as an example for description. The communication method includes: sending first information to a first entity, where the first information includes second information, or includes first application identification information and second information corresponding to the first application identification information, the second information is extended mechanisms for DNS client subnet option corresponding to a first identifier or address information of a local DNS resolver corresponding to a first identifier, the first identifier is a data network access identifier of a data network with a smallest service scope or closest to a terminal device in data networks corresponding to a second identifier, the second identifier is at least one data network access identifier corresponding to a current location of the terminal device, and the first information is used to determine the second information.

In at least one embodiment, the session management function network element actively sends the first information to the first entity, so that after receiving request information that is from the terminal device and that includes application identification information, the first entity determines the second information based on the first information, and send DNS request information to a central DNS server or the local DNS resolver based on the second information. This prevents the first entity from obtaining the second information from the session management function network element each time after receiving the request information that is from the terminal device and that includes the application identification information, so that a quantity of times of communication between the first entity and the session management function network element is reduced, thereby saving transmission resources. In addition, after receiving the request information from the terminal device, the first entity reduces a processing delay of the DNS request information without interacting with the session network function network element.

In at least one embodiment, the first information further includes a third identifier and third information corresponding to the third identifier. The third identifier is application identification information of an application deployed on a data network corresponding to the second identifier. The third information is extended mechanisms for DNS client subnet option corresponding to the third identifier or address information of a local DNS resolver corresponding to the third identifier.

In at least one embodiment, in addition to the first application identification information and the second information corresponding to the first application identification information, the first information further includes the third identifier and the third information corresponding to the third identifier, so that in response to the first entity subsequently receiving request information including other application identification information from the terminal device, a quantity of times of obtaining the first information from the session management function network element is reduced, and a quantity of times of communication between the session management function network element and the first entity is reduced, thereby saving transmission resources. In addition, after receiving the request information from the terminal device, the first entity reduces a processing delay of the DNS request information without interacting with the session network function network element.

In at least one embodiment, the communication method further includes: receiving the first application identification information and/or first indication information from the first entity. That the session management function network element sends first information to a first entity includes: sending the first information to the first entity based on the first application identification information and/or the first indication information.

In at least one embodiment, the session management function network element sends the first information to the first entity only after receiving information used to obtain the first information from the first entity. The first information is sent by the session management function network element to the first entity in response to the first entity needing the first information.

In at least one embodiment, the communication method further includes: sending second indication information to the first entity, where the second indication information indicates to delete the first information.

In at least one embodiment, the session management function network element sends, to the first entity, indication information used to delete the first information, so that the first entity deletes the first information based on an indication of the session management function network element. This reduces information stored in the first entity, and save storage space of the first entity.

According to a fifth aspect, a communication apparatus is disclosed. The apparatus is a first entity, or is a module (for example, a chip) in the first entity. The apparatus includes: a receiving unit, configured to receive first request information from a terminal device, where the first request information includes first application identification information; a determining unit, configured to determine second information based on the first application identification information and first information obtained from a session network function network element, where the second information is extended mechanisms for DNS client subnet option or address information of a local DNS resolver; and a sending unit, configured to send DNS request information to a central DNS server or the local DNS resolver based on the second information, where the DNS request information includes the first application identification information, and the DNS request information is used to obtain address information of an application server.

In at least one embodiment, the receiving unit is further configured to receive the first information from the session management function network element, where the first information includes the first application identification information and the second information corresponding to the first application identification information.

In at least one embodiment, the receiving unit is further configured to receive the first information from the session management function network element, where the first information includes the first application identification information, a first identifier, and the second information corresponding to the first application identification information and the first identifier, and the first identifier is at least one data network access identifier.

In at least one embodiment, the receiving unit is further configured to receive a second identifier from the session management function network element, where the second identifier is a data network access identifier corresponding to a current location of the terminal device. The determining unit is specifically configured to determine the second information based on the first application identification information, the second identifier, and the first information obtained from the session network function network element.

In at least one embodiment, the sending unit is further configured to: before the receiving unit receives the first information from the session management function network element, send the first application identification information and/or first indication information to the session management function network element, where the first application identification information is used to obtain the first information, and the first indication information indicates the session management function network element to send the first information.

In at least one embodiment, the first information further includes a third identifier, the first identifier, and third information corresponding to the first identifier and the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, the first information further includes a third identifier and third information corresponding to the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, the receiving unit is further configured to receive second indication information and a fourth identifier from the session management function network element, where the fourth identifier is a data network access identifier of a data network that no longer serves the terminal device, and the first identifier includes the fourth identifier. The apparatus further includes: a deletion unit, configured to delete, based on the second indication information, information corresponding to the fourth identifier from the first information.

In at least one embodiment, that the receiving unit receives second indication information and a fourth identifier from the session management function network element includes: receiving the second indication information, the fourth identifier, and a fifth identifier from the session management function network element, where the fifth identifier is application identification information of an application deployed on a data network corresponding to the fourth identifier. The deletion unit is specifically configured to delete information corresponding to the fourth identifier and the fifth identifier from the first information.

In at least one embodiment, that the sending unit sends DNS request information to a central DNS server or the local DNS resolver based on the second information includes: in response to the second information being the extended mechanisms for DNS client subnet option, sending the DNS request information to the central DNS server, where the DNS request further includes the second information; or in response to the second information being the address information of the local DNS resolver, sending the DNS request information to the local DNS resolver.

According to a sixth aspect, a communication apparatus is disclosed. The apparatus is a session management function network element, or is a module (for example, a chip) in the session management function network element. The apparatus includes: a sending unit, configured to send first information to a first entity, where the first information includes first application identification information and second information corresponding to the first application identification information, or includes first application identification information, a first identifier, and second information corresponding to the first application identification information and the first identifier, where the first identifier is at least one data network access identifier, the second information is extended mechanisms for DNS client subnet option or address information of a local DNS resolver, and the first information is used by the first entity to determine the second information.

In at least one embodiment, the sending unit is further configured to send a second identifier to the first entity, where the second identifier is a data network access identifier corresponding to a current location of a terminal device. That the first information is used to determine the second information includes: the first information and the second identifier are used to determine the second information.

In at least one embodiment, the apparatus further includes: a receiving unit, configured to receive the first application identification information and/or first indication information from the first entity. That the sending unit sends first information to a first entity includes: sending the first information to the first entity based on the first application identification information and/or the first indication information.

In at least one embodiment, the first information further includes a third identifier, the first identifier, and third information corresponding to the first identifier and the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, the first information further includes a third identifier and third information corresponding to the third identifier. The third identifier is application identification information of an application deployed on a data network corresponding to the first identifier. The third information is extended mechanisms for DNS client subnet option corresponding to the third identifier or address information of a local DNS resolver corresponding to the third identifier.

In at least one embodiment, the sending unit is further configured to send second indication information and a fourth identifier to the first entity, where the fourth identifier is a data network access identifier of a data network that no longer serves the terminal device, the first identifier includes the fourth identifier, and the second indication information is used to delete information corresponding to the fourth identifier from the first information.

In at least one embodiment, that the sending unit sends second indication information and a fourth identifier to the first entity includes: sending the second indication information, the fourth identifier, and a fifth identifier to the first entity, where the fifth identifier is application identification information of an application deployed on a data network corresponding to the fourth identifier. That the second indication information is used to delete information corresponding to the fourth identifier from the first information includes: the second indication information is used to delete information corresponding to the fourth identifier and the fifth identifier from the first information.

According to a seventh aspect, a communication apparatus is disclosed. The apparatus is a first entity, or is a module (for example, a chip) in the first entity. The apparatus includes: a receiving unit, configured to receive first request information from a terminal device, where the first request information includes first application identification information; a determining unit, configured to determine second information based on first information obtained from a session management function network element, where the second information is extended mechanisms for DNS client subnet option corresponding to a first identifier or address information of a local DNS resolver corresponding to a first identifier, the first identifier is a data network access identifier of a data network with a smallest service scope or closest to the terminal device in data networks corresponding to a second identifier, and the second identifier is at least one data network access identifier corresponding to a current location of the terminal device; and a sending unit, configured to send DNS request information to a central DNS server or the local DNS resolver based on the second information, where the DNS request information includes the first application identification information, and the DNS request information is used to obtain address information of an application server.

In at least one embodiment, the receiving unit is further configured to receive the first information from the session management function network element, where the first information includes the second information.

In at least one embodiment, the receiving unit is further configured to receive the first information from the session management function network element, where the first information includes the first application identification information and the second information corresponding to the first application identification information.

In at least one embodiment, the first information further includes a third identifier and third information corresponding to the third identifier. The third identifier is application identification information of an application deployed on a data network corresponding to the second identifier. The third information is extended mechanisms for DNS client subnet option corresponding to the third identifier or address information of a local DNS resolver corresponding to the third identifier.

In at least one embodiment, the sending unit is further configured to send the first application identification information and/or first indication information to the session management function network element, where the first application identification information is used to obtain the first information, and the first indication information indicates the session management function network element to send the first information.

In at least one embodiment, the receiving unit is further configured to receive second indication information from the session management function network element, where the second indication information indicates to delete the first information. The apparatus further includes: a deletion unit, configured to delete the first information based on the second indication information.

In at least one embodiment, that the sending unit sends DNS request information to a central DNS server or the local DNS resolver based on the second information includes: in response to the second information being the extended mechanisms for DNS client subnet option, sending the DNS request information to the central DNS server, where the DNS request further includes the second information; or in response to the second information being the address information of the local DNS resolver, sending the DNS request information to the local DNS resolver.

According to an eighth aspect, a communication apparatus is disclosed. The apparatus is a session management function network element, or is a module (for example, a chip) in the session management function network element. The apparatus includes a sending unit, configured to send first information to a first entity, where the first information includes second information, or includes first application identification information and second information corresponding to the first application identification information, the second information is extended mechanisms for DNS client subnet option corresponding to a first identifier or address information of a local DNS resolver corresponding to a first identifier, the first identifier is a data network access identifier of a data network with a smallest service scope or closest to a terminal device in data networks corresponding to a second identifier, the second identifier is at least one data network access identifier corresponding to a current location of the terminal device, and the first information is used to determine the second information.

In at least one embodiment, the first information further includes a third identifier and third information corresponding to the third identifier. The third identifier is application identification information of an application deployed on a data network corresponding to the second identifier. The third information is extended mechanisms for DNS client subnet option corresponding to the third identifier or address information of a local DNS resolver corresponding to the third identifier.

In at least one embodiment, the apparatus further includes: a receiving unit, configured to receive the first application identification information and/or first indication information from the first entity. The sending unit is specifically configured to send the first information to the first entity based on the first application identification information and/or the first indication information.

In at least one embodiment, the sending unit is further configured to send second indication information to the first entity, where the second indication information indicates to delete the first information.

According to a ninth aspect, a communication apparatus is disclosed. The communication apparatus is a first entity or a module (for example, a chip) in the first entity. The communication apparatus includes a processor, a memory, an input interface, and an output interface. The input interface is configured to receive information from a communication apparatus other than the communication apparatus. The output interface is configured to output information to a communication apparatus other than the communication apparatus. In response to the processor executing a computer program stored in the memory, the processor is enabled to perform the communication method disclosed in the first aspect.

According to a tenth aspect, a communication apparatus is disclosed. The communication apparatus is a session network function network element or a module (for example, a chip) in the session network function network element. The communication apparatus includes a processor, a memory, an input interface, and an output interface. The input interface is configured to receive information from a communication apparatus other than the communication apparatus. The output interface is configured to output information to a communication apparatus other than the communication apparatus. In response to the processor executing a computer program stored in the memory, the processor is enabled to perform the communication method disclosed in the second aspect.

According to an eleventh aspect, a communication apparatus is disclosed. The communication apparatus is a first entity or a module (for example, a chip) in the first entity. The communication apparatus includes a processor, a memory, an input interface, and an output interface. The input interface is configured to receive information from a communication apparatus other than the communication apparatus. The output interface is configured to output information to a communication apparatus other than the communication apparatus. In response to the processor executing a computer program stored in the memory, the processor is enabled to perform the communication method disclosed in the third aspect.

According to a twelfth aspect, a communication apparatus is disclosed. The communication apparatus is a session network function network element or a module (for example, a chip) in the session network function network element. The communication apparatus includes a processor, a memory, an input interface, and an output interface. The input interface is configured to receive information from a communication apparatus other than the communication apparatus. The output interface is configured to output information to a communication apparatus other than the communication apparatus. In response to the processor executing a computer program stored in the memory, the processor is enabled to perform the communication method disclosed in the fourth aspect.

According to a thirteenth aspect, a communication system is disclosed. The communication system includes the communication apparatus according to the ninth aspect and the communication apparatus according to the tenth aspect.

According to a fourteenth aspect, a communication system is disclosed. The communication system includes the communication apparatus according to the eleventh aspect and the communication apparatus according to the twelfth aspect.

According to a fifteenth aspect, a computer-readable storage medium is disclosed. The computer-readable storage medium stores a computer program or computer instructions. In response to the computer program or the computer instructions being run, the communication method disclosed in any one of the foregoing aspects is implemented.

According to a sixteenth aspect, a chip is disclosed. The chip includes a processor, configured to execute a program stored in a memory. In response to the program being executed, the chip is enabled to perform the foregoing method.

In at least one embodiment, the memory is located outside the chip.

According to a seventeenth aspect, a computer program product is disclosed. The computer program product includes computer program code. In response to the computer program code being run, the communication method is performed.

DESCRIPTION OF EMBODIMENTS

Embodiments described herein provide a communication method and apparatus, and a computer-readable storage medium, to save communication resources. Detailed descriptions are separately provided below.

Figure 1:
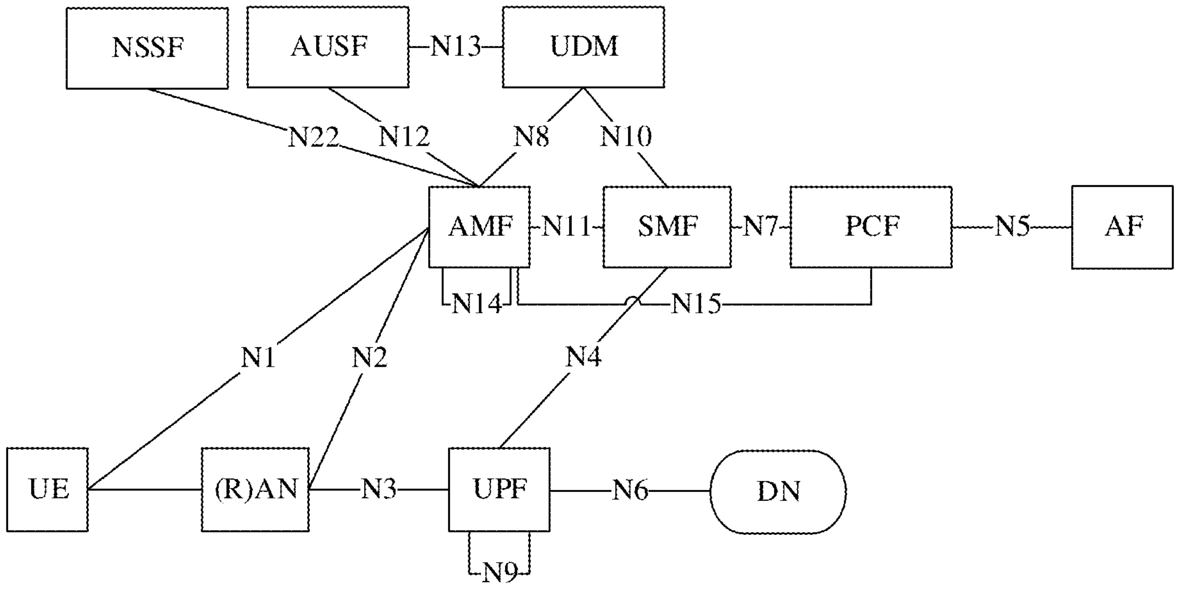
FIG. 1 is a schematic diagram of a 5G network architecture according to at least one embodiment.

To better understand a communication method and apparatus, and a computer-readable storage medium disclosed in at least one embodiment, the following first describes a network architecture used in at least one embodiment. FIG. 1 is a schematic diagram of a 5G network architecture according to at least one embodiment. As shown in FIG. 1, the 5G network architecture includes user equipment (user equipment, UE), a (radio) access network (radio access network, (RAN) device, a user plane function (user plane function, UPF) network element, and a data network (data network, DN), an access and mobility management function (access and mobility management function, AMF) network element, a session management function (session management function, SMF) network element, a policy control function (policy control function, PCF) network element, an application function (application function, AF) network element, a unified data management (unified data management, UDM) network element, an authentication server function (authentication server function, AUSF) network element, and a network slice selection function (network slice selection function, NSSF) network element. Different network elements or devices communicates with each other through an interface. An interface name shown in FIG. 1 is merely an example for description. This is not specifically limited in at least one embodiment.

The UE is alternatively referred to as a terminal device, a mobile station (mobile station, MS), a mobile terminal (mobile terminal, MT), or the like, and is a device that provides a user with voice or data connectivity. The terminal device is a handheld terminal, a notebook computer, a subscriber unit (subscriber unit), a cellular phone (cellular phone), a smartphone (smartphone), a wireless data card, a personal digital assistant (personal digital assistant, PDA) computer, a tablet computer, a wireless modem, a handheld (handheld) device, a laptop computer, a cordless phone (cordless phone), or a wireless local loop (wireless local loop, WLL) station, a machine type communication (machine type communication, MTC) terminal, a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an uncrewed aerial vehicle, or an aircraft), or other devices that accesses a network. The terminal device in FIG. 1 is shown by using the UE. This is merely used as an example and is not limited to the terminal device. The UE accesses a DN by establishing a session among the UE, the (R)AN device, a UPF, and the DN, that is, a protocol data unit (protocol data unit, PDU) session.

The (R)AN device is a device that provides radio access for the UE, and is mainly responsible for functions such as radio resource management, quality of service (quality of service, QoS) flow management, and data compression and encryption on an air interface side. The (R)AN device includes base stations in various forms, for example, a macro base station, a micro base station (also referred to as a small cell), a relay station, and an access point. The (R)AN device further includes a wireless fidelity (wireless fidelity, Wi-Fi) access point (access point, AP). The (R)AN device further includes a worldwide interoperability for microwave access (worldwide interoperability for microwave access, WiMax) base station (base station, BS).

The UPF network element is mainly responsible for processing a user packet, such as forwarding and charging for the user packet. The user packet is received from the DN, and transmitted to the UE through the RAN device. Alternatively, the user packet is received from the UE through the RAN device, and forwarded to the DN. Transmission resources and scheduling functions in the UPF network element that provide services for the UE are managed and controlled by the SMF network element.

The DN is an Internet (Internet), an IP multimedia service (IP multimedia service, IMS) network, a regional network, that is, a local network, for example, a multi-access edge computing (multi-access edge computing, MEC) network, or the like. The DN is a destination that a PDU session of the UE accesses. The DN includes or is deployed with an application server, and the application server performs data transmission with the UE, to provide a service for the UE.

The AMF network element accesses non-access stratum (non-access stratum, NAS) signaling (including session management (session management, SM) signaling) of the UE through an N1 interface and access RAN signaling through an N2 interface, to complete a UE registration procedure, SM signaling forwarding, and mobility management.

The SMF network element is mainly responsible for session management in a mobile network, such as session establishment, modification, release, and update. For example, specific functions are allocation of an IP address for a user and selection of a UPF network element that provides a packet forwarding function.

The PCF network element is responsible for terminal device policy management, including both a mobility related policy and a PDU session related policy, such as a QoS policy and a charging policy.

The AF network element mainly supports interaction with a 3rd generation partnership project (3rd generation partnership project, 3GPP) core network to provide a service, to affect service flow routing, access network capability exposure, policy control, and the like.

The UDM network element is responsible for user key management, user identifier processing, subscription data access authorization, network function entity management of the UE, session and service continuity management, short message push, lawful interception, subscription management, short message management, and user data management and control, such as subscription information management.

The AUSF network element is responsible for performing authentication and authorization on access of the UE.

Each of the network elements in the core network is also referred to as a functional entity, and is a network element implemented on dedicated hardware, a software instance running on dedicated hardware, or an instance of a virtualization function on an appropriate platform. For example, the virtualization platform is a cloud platform.

The system architecture shown in FIG. 1 is not limited to only the network elements shown in the figure, and further includes other devices that are not shown in the figure. Details are not listed one by one in at least one embodiment.

A distribution form of the network elements in the core network is not limited in at least one embodiment. The distribution form shown in FIG. 1 is merely an example, and is not a limitation of embodiments described herein.

Names of all network elements in at least one embodiment are merely used as examples. In future communication, for example, 6G, names of the network elements is also referred to as other names. Alternatively, in future communication, for example, 6G, the network elements in at least one embodiment is replaced with other entities, devices, or the like that have a same function. This is not limited in at least one embodiment. Unified descriptions are provided herein, and details are not described below again.

The 5G network architecture shown in FIG. 1 does not constitute a limitation on a 5G network. Optionally, the method in at least one embodiment is further applied to various future communication systems, for example, a 6G system or another communication network.

Figure 2:
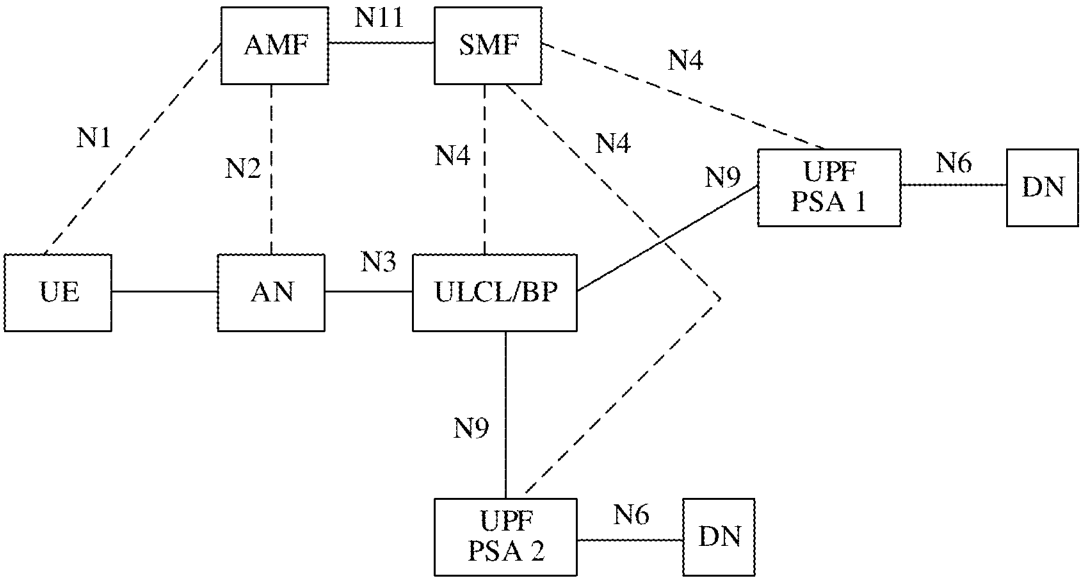
FIG. 2 is a schematic diagram of a network architecture according to at least one embodiment.

There is only one UPF network element in the 5G network architecture shown in FIG. 1. Based on the foregoing basic network architecture, 5G further supports insertion of a plurality of session anchor UPF network elements on a user plane path (that is, data path) of a PDU session, to support a connection to a local (local) DN, so that the UE accesses a nearby application server in the local DN. FIG. 2 is a schematic diagram of a network architecture according to at least one embodiment. As shown in FIG. 2, a plurality of UPF network elements are introduced into a network architecture of a communication system. The plurality of UPF network elements is respectively an uplink classifier (uplink classifier, ULCL)/branching point (branching point, BP), a UPF PDU session anchor (PDU session anchor, PSA) 1, and a UPF PSA 2. The ULCL/BP distributes an uplink data packet from UE to the PSA 1 or the PSA 2 according to a distribution rule, or sends a downlink data packet from the PSA 1 or the PSA 2 to UE. There is an N6 interface between the PSA 1 and a DN. For example, the DN is a DN located in a central data center (data central, DC). There is an N6 interface between the PSA 2 and a local DN. For example, the local DN is located in a local DC or an MEC node. The local DN is also understood as a DN that deploys an application server to an edge hosting environment (edge hosting environment, EHE) closer to the UE, and is also referred to as an EAS. In response to the UE having a service requirement, an SMF network element inserts a UPF network element (namely, a local (local, L)-PSA) corresponding to the local DN, so that the UE accesses a nearby application server in the local DN. For example, the PAS 2 in FIG. 2 is an L-PSA. A quantity of UPF network elements in FIG. 2 is merely an example, and more or fewer UPFs is alternatively included. This is not limited in at least one embodiment.

Figure 3:
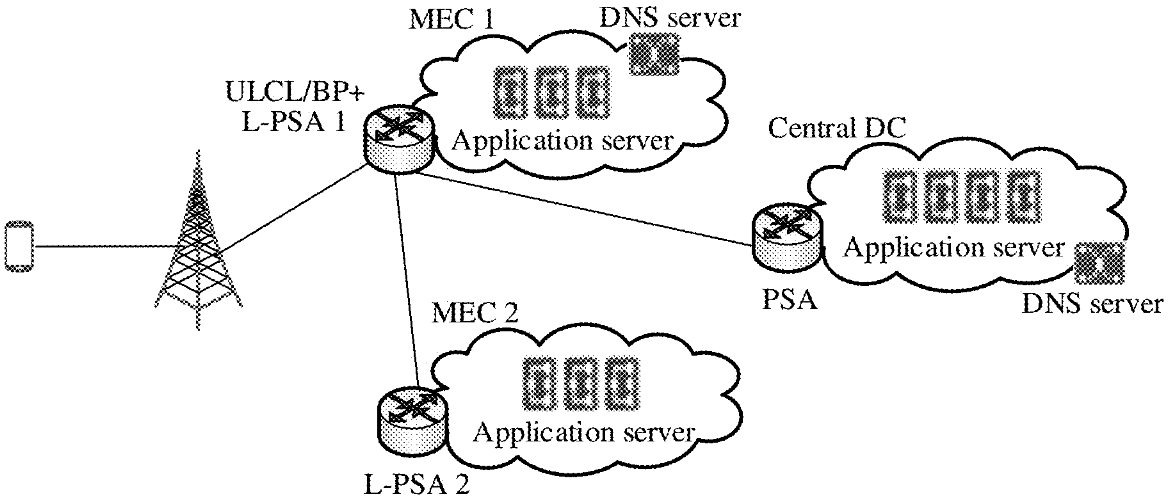
FIG. 3 is a schematic diagram of another network architecture according to at least one embodiment.

Only one L-PSA is shown in FIG. 2. A plurality of L-PSAs and a plurality of ULCLs/BPs are alternatively included. This is not limited in at least one embodiment. FIG. 3 is a schematic diagram of another network architecture according to at least one embodiment. As shown in FIG. 3, there is a plurality of L-PSAs in the network architecture, for example, an L-PSA 1 and an L-PSA 2 in FIG. 3. In this network architecture, a ULCL/BP is connected to the plurality of L-PSAs. In this example, the ULCL/BP is co-deployed with the L-PSA 1, and is connected to an MEC 1; and the L-PSA 2 is connected to an MEC 2, and a PSA is connected to a central DC. The ULCL/BP and the L-PSA 1 are alternatively two independent network elements or devices.

For better understanding embodiments described herein, the following first describes an application scenario of embodiments of embodiments described herein. In the 4th generation mobile communication technology (the 4th generation mobile communication technology, 4G) and before 4G, user plane devices are basically deployed in a tree topology in conventional mobile network architectures and deployment. An uplink user packet passes through a base station and a backhaul network, and finally accesses a data network through anchor gateways deployed in a centralized manner. These anchor gateways are generally deployed at an upper location in the data network, for example, a central equipment room in a large area. This topology structure is simple, so that an operator performs centralized service management and control and packet processing at the anchor gateways.

With the explosive growth of mobile service traffic, this deployment mode becomes increasingly difficult to support the fast-growing mobile service traffic model. In an aspect, in a network on which anchor gateways are deployed in a centralized manner, increased traffic is finally concentrated at a gateway and a core equipment room, and requirements on backhaul network bandwidth, an equipment room throughput, and a gateway specification are increasingly high. In another aspect, a long-distance backhaul network from the base station to the anchor gateway and a complex transmission environment cause a long delay and jitter in user packet transmission.

To resolve the foregoing problems, an EC is proposed in the industry. The EC moves a UPF network element and service processing capability to a network edge to implement local processing of distributed service traffic. This avoids excessive traffic concentration and greatly reduces specification requirements for the core equipment room and centralized gateways. In addition, the distance of the backhaul network is shortened, and the delay and jitter of user packets are reduced, making ultra-low delay service deployment possible.

In an EC deployment scenario, EASs corresponding to some services is deployed at a plurality of network edges in a distributed manner. These EASs provide same services and content, but has different IP addresses. In response to UE needing to access the service, in the EC scenario, the UE needs to access an available EAS nearest to the UE. Therefore, the UE needs to obtain an IP address of an appropriate EAS.

Figure 4:
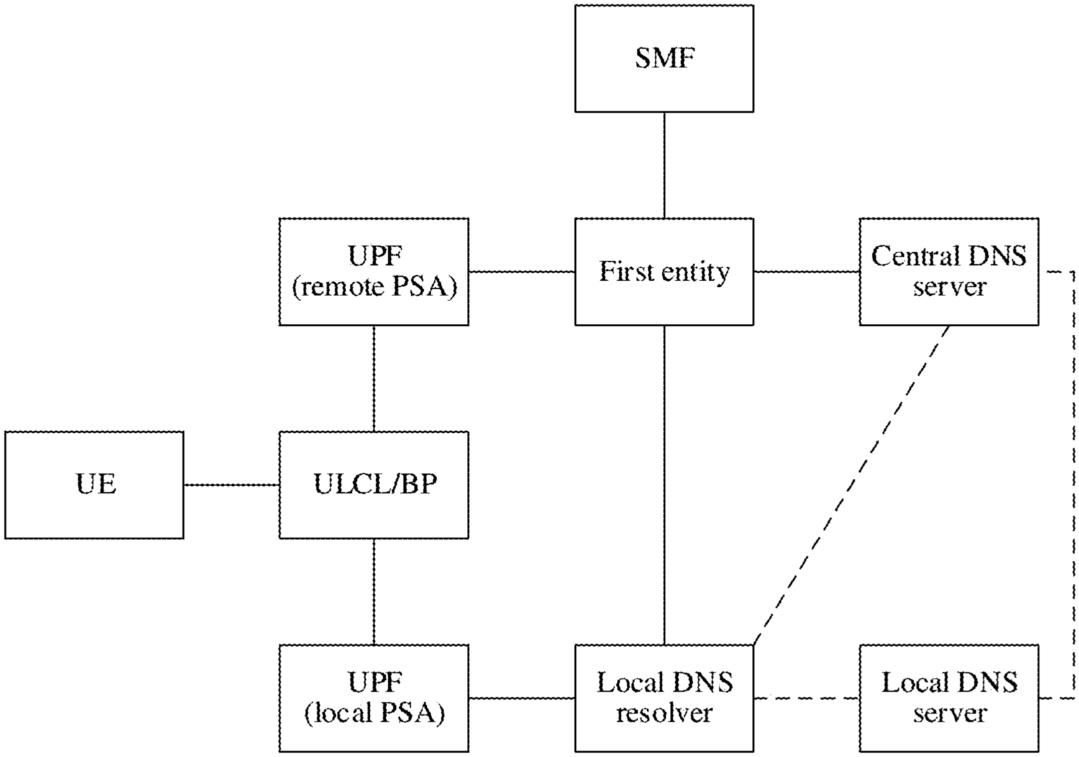
FIG. 4 is a schematic diagram of local service discovery according to at least one embodiment.

FIG. 4 is a schematic diagram of local service discovery according to at least one embodiment. As shown in FIG. 4, UE sends first request information to a first entity. The first request information carries or includes application identification information. After receiving the first request information from the UE, the first entity sends second request information to an SMF network element. The second request information includes the application identification information. After receiving the second request information from the first entity, the SMF network element sends, to the first entity, information associated with a current location of the UE, for example, extended mechanisms for DNS (extended mechanisms for DNS, EDNS) client subnet option (EDNS client subnet option, ECS option) or address information of a local DNS resolver (resolver). After receiving the information from the SMF network element, in response to the information being the ECS option, the first entity sends first DNS request information to a central (central) DNS server.

The first DNS request information includes the application identification information and the information. After receiving the first DNS request information from the first entity, the central DNS server determines address information of an application server corresponding to the application identification information and the information, and send the address information of the application server to the UE by using the first entity. In response to the information being the address information of the local DNS resolver, the first entity sends the second request information to the local DNS resolver. The second request information includes the application identification information. After receiving the second request information from the first entity, the local DNS resolver sends address information of an application server to the UE in response to the address information of the application server corresponding to the application identification information and the information being determined, or sending third request information to the central DNS server or the local DNS server in response to the address information of the application server corresponding to the application identification information and the information not beng determined. The second request information and the third request information is DNS request information, or is other request information. This is not limited herein. The ECS option is address information of a local UPF network element, or is address information of an MEC platform subnet corresponding to a current location of the terminal device, or is address information of a network segment at which the terminal device is located, or is other information associated with a location of the terminal device. The address information is an IP address, or is other information that uniquely identifies an address.

In the foregoing method, each time the UE sends one piece of request information, the first entity needs to perform signaling interaction with the SMF network element twice. However, both the first entity and the SMF network element serve a large quantity of UEs, and each UE generates a large quantity of pieces of request information. Consequently, signaling interaction between the first entity and the SMF network element is excessively frequent, resulting in a large quantity of signaling overheads and resource insufficiency. In addition, because signaling interaction needs to be performed twice between the first entity and the SMF network element, a delay in obtaining the address information of the application server by the UE is increased.

The first entity is an independent device or network element, or is a function or model deployed on another device or network element.

Figure 5:
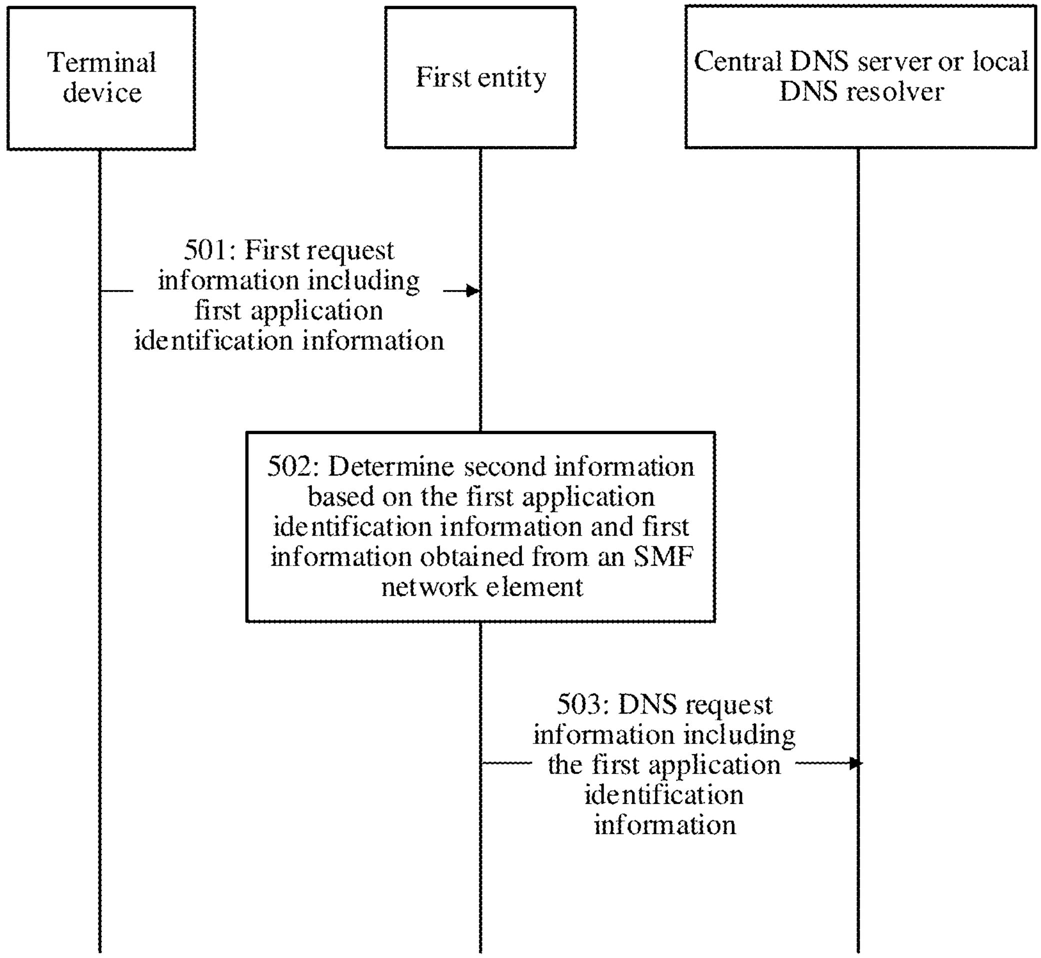
FIG. 5 is a schematic flowchart of a communication method according to at least one embodiment.

Based on the foregoing network architecture, FIG. 5 is a schematic flowchart of a communication method according to at least one embodiment. As shown in FIG. 5, the communication method includes the following steps.

501: A terminal device sends first request information including first application identification information to a first entity.

Correspondingly, the first entity receives, from the terminal device, the first request information including the first application identification information.

In response to the terminal device having a service requirement, the terminal device sends the first request information to the first entity. The terminal device sends the first request information to the first entity by using a ULCL/BP and a PSA, or sends the first request information to the first entity by using another device or network element. This is not limited herein. The first request information is DNS request information, or is a DNS query (query) message, or is other request information. This is not limited herein. Application identification information is information for identifying an application, and is a fully qualified domain name (fully qualified domain name, FQDN), or is an application identifier (application identifier, AppID), or is a service identifier, or is other information that is used for uniquely identifying an application.

In a case, the first request information does not include an identifier of the terminal device, but an SMF network element determines, by using a PDU session that transmits the first request information, a terminal device that sends the first request information.

In another case, the first request information further includes an identifier of the terminal device. The first entity determines, based on the identifier of the terminal device, a terminal device that sends the first request information.

502: The first entity determines second information based on the first application identification information and first information obtained from the SMF network element.

After receiving the first request information from the terminal device, the first entity determines the second information based on the first application identification information and the first information obtained from the SMF network element. The first entity first searches for or match first information including the first application identification information from the first information obtained by the SMF network element, and then obtains, from the found or matched first information, the second information corresponding to the first application identification information. The second information is information associated with a current location of the terminal device, that is, information associated with the current location of the terminal device. The second information is an ECS option, or is address information of a local DNS resolver, or is other information associated with a location of the terminal device.

In at least one embodiment, the first information includes the first application identification information and the second information corresponding to the first application identification information. In addition, the first information further includes a third identifier and third information corresponding to the third identifier. The third identifier is application identification information of an application deployed on a data network corresponding to a first identifier, and the third information is an ECS option corresponding to the third identifier or address information of a local DNS resolver corresponding to the third identifier.

The first information is understood as including two parts: the application identification information and fourth information. The fourth information is the information associated with the current location of the terminal device, includes the second information, and further includes the third information. There is a one-to-one correspondence between the application identification information and the fourth information included in the first information, in other words, one piece of application identification information corresponds only to one piece of fourth information. Correspondingly, one piece of fourth information corresponds only to one piece of application identification information. There is alternatively a many-to-one correspondence between the application identification information and the fourth information included in the first information, in other words, one piece of application identification information corresponds to one piece of fourth information, or a plurality of pieces of application identification information corresponds to one piece of fourth information. A relationship between the application identification information and the fourth information is represented as a correspondence between the application identification information and the fourth information, and is stored in a form of a data table, a key-value pair, or a context, or another form. A storage form is not limited. For example, the correspondence between the application identification information and the fourth information is shown in Table 1 or Table 2.

TABLE 1

| Application identification information | Fourth information |
| --- | --- |
| Application 1 | Information 1 |
| Application 2 | Information 2 |
| . . . | . . . |
| Application K | Information K |

TABLE 2

| Application identification information | Fourth information |
| --- | --- |
| Application 1 | Information 1 |
| Application 2 | Information 1 |
| . . . | . . . |
| Application K | Information M |

K and M are integers greater than or equal to 1. Application 1 to application K in the foregoing tables are application identifiers, and information 1 to information K are information that is associated with the current location of the terminal device and that corresponds to the application identifiers.

Further, the first information further includes a data network access identifier (data network access identifier, DNAI) corresponding to the first application identification information and the second information. The first information further includes a DNAI corresponding to the third identifier and the third information. The DNAI is an identifier of a user plane access to a data network on which an application is deployed (identifier of a user plane access to one or more DN(s) where applications are deployed). The DNAI is an identifier of an access point of edge computing, or is an identifier of access (or a location) of a server deployed at a network edge. In response to the first information including the DNAI, one piece of application identification information and one DNAI in the first information uniquely determines one piece of information associated with the current location of the terminal device.

In at least one embodiment, the first information includes the first application identification information, a first identifier, and the second information corresponding to the first application identification information and the first identifier. The first identifier is at least one DNAI. The first information further includes a third identifier, the first identifier, and third information corresponding to the first identifier and the third identifier.

One DNAI and one piece of application identification information included in the first information uniquely determines one piece of fourth information. A relationship among the DNAI, the application identification information, and the fourth information is represented as a correspondence among the DNAI, the application identification information, and the fourth information, and is stored in a form of a data table, a key-value pair, or a context, or in another form. A storage form is not limited. For example, the correspondence among the DNAI, the application identification information, and the fourth information is shown in Table 3.

TABLE 3

| DNAI | Application identification information | Fourth information |
| --- | --- | --- |
| DNAI 1 | Application 1 | Information 1 |
| DNAI 2 | Application 2 | Information 2 |
| . . . | . . . | . . . |
| DNAI K | Application K | Information K |

Information 1 to information K in Table 3 correspond to K pieces of different information. A same application exists in applications corresponding to application 1 to application K, and a same DNAI exists in DNAI 1 to DNAI K, but a same combination of a DNAI and application identification information should not exist.

The first information includes not only information currently used for determining the second information, but also information not currently used for determining the second information. The information is used after the first entity receives other request information including the application identification information, so that interaction between the first entity and the SMF network element is reduced, thereby saving transmission resources.

The SMF network element sends the first information to the first entity. The SMF network element actively sends the first information to the first entity. For example, in response to the SMF network element detecting that the terminal device establishes a PDU session, or a DNAI corresponding to the current location of the terminal device changes, the SMF network element sends the first information to the first entity. Alternatively, the SMF network element sends the first information to the first entity after receiving information used to obtain the first information from the first entity.

Correspondingly, the first entity receives the first information from the SMF network element. The first information is received by the first entity before or in response to the first entity receiving the first request information, or is received by the first entity after the first entity receives the first request information. In response to the first information being received by the first entity before the first entity receives the first request information, the first information is actively sent by the SMF to the first entity, or is obtained by the first entity from the SMF network element after the first entity previously receives other request information including the application identification information. Therefore, after receiving the first request information, the first entity does not need to obtain the first information from the SMF network element, so that interaction between the first entity and the SMF network element is reduced, thereby saving transmission resources.

After receiving the first request information from the terminal device, the first entity first determines whether the first information that is used to determine the second information exists. In response to determining that the first information that is used to determine the second information exists, the first entity determines the second information based on the first information and the first application identification information. In response to determining that the first information that is used to determine the second information does not exist, the first entity first sends the first application identification information and/or first indication information to the SMF network element. After receiving the first application identification information and/or the first indication information from the first entity, the SMF network element sends the first information to the first entity based on the first application identification information and/or the first indication information. In addition, the SMF network element further sends the second information to the first entity together with the first information. In response to the SMF network element not sending the second information to the first entity, after receiving the first information from the SMF network element, the first entity determines the second information based on the first application identification information and the first information.

In response to the first entity sends the first indication information to the SMF network element, the SMF network element determines the first information based on the current location of the terminal device, that is, determines the first information based on the DNAI corresponding to the current location of the terminal device, or determines the first information based on the fact that an area corresponding to DNAIs includes the DNAI of the current location of the terminal device. In response to the first entity sending the first application identification information to the SMF network element, the SMF network element determines the first information based on the first application identification information, or determines the first information based on the first application identification information and the current location of the terminal device. In response to the first entity sending the first application identification information and the first indication information to the SMF network element, the SMF network element determines the first information based on the first application identification information and the current location of the terminal device.

In addition, the SMF network element alternatively considers service subscription information of the terminal device, and determines the first information based on an edge service that is subscribed to by the terminal device and that is in the service subscription information, that is, determine the first information based on application identification information in the service subscription information of the terminal device and the first application identification information.

In response to the first entity sending the first application identification information to the SMF network element, the first information includes the first application identification information. In addition, the first information further includes application identification information other than the first application identification information, DNAIs of data networks on which applications corresponding to the application identification information are deployed, and ECS options corresponding to the application identification information and the DNAIs or local DNS resolver addresses corresponding to the application identification information and the DNAIs. The application identification information includes one or more of the following:

(a) application identification information of some or all of applications deployed on a first data network, where the first data network is a data network that corresponds to the current location of the terminal device and on which an application corresponding to the first application identification information is deployed;
(b) application identification information of an application that is deployed on the first data network but not deployed on a second data network, where the second data network is a set of data networks that correspond to the current location of the terminal device and whose service scopes are included in the first data network;
(c) application identification information of some or all of applications deployed on the second data network; and
(d) application identification information of some or all of applications deployed on a third data network but not deployed on the first data network and the second data network, where the third data network is a set of data networks whose service scopes include the first data network.

Figure 6:
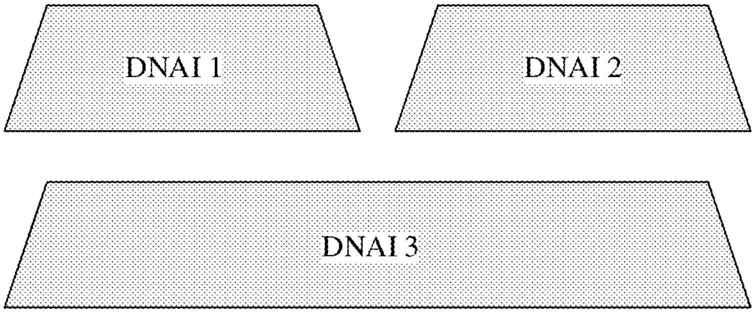
FIG. 6 is a schematic diagram of DNAI deployment according to at least one embodiment.

For example, FIG. 6 is a schematic diagram of DNAI deployment according to at least one embodiment. As shown in FIG. 6, a service scope of DNAI 3 is greater than a service scope of DNAI 1 and a service scope of DNAI 2. The service scope of DNAI 3 includes the service scope of DNAI 1 and the service scope of DNAI 2, but the service scope of DNAI 1 and the service scope of DNAI 2 are not overlapped. The following provides description by using an example in which the application identification information is an FQDN and the information associated with the current location of the terminal device is an ECS option. Service S1 and service S3 are deployed on DNAI 1. Service S1 corresponds to FQDN 1 and ECS option 1, and service 3 corresponds to FQDN 3 and ECS option 3. Service S2 is deployed on DNAI 2. Service S2 corresponds to FQDN 2 and ECS option 2. Services S3, S4, and S5 are deployed on DNAI 3. Service S3 corresponds to FQDN 3 and ECS option 3', service S4 corresponds to FQDN 4 and ECS option 4, and service S5 corresponds to FQDN 5 and ECS option 5. In response to the terminal device being currently in the service scope of DNAI 1 and the service scope of DNAI 3, after the SMF network element receives request information including FQDN 4 from the first entity, the SMF network element sends, to the first entity, FQDN 4 and ECS option 4 corresponding to FQDN 4 (or FQDN 4, DNAI 3, and ECS option 4 corresponding to FQDN 4 and DNAI 3). In addition, the SMF network element further sends one or more of the following information to the first entity:

(a) FQDN 3 and ECS option 3' corresponding to FQDN 3 (or FQDN 3, DNAI 3, and ECS option 3' corresponding to FQDN 3 and DNAI 3), and FQDN 5 and ECS option 5 corresponding to FQDN 5 (or FQDN 5, DNAI 3, and ECS option 5 corresponding to FQDN 5 and DNAI 3);
(b) FQDN 5 and ECS option 5 corresponding to FQDN 5 (or FQDN 5, DNAI 3, and ECS option 5 corresponding to FQDN 5 and DNAI 3);
(c) FQDN 1 and ECS option 1 corresponding to FQDN 1 (or FQDN 1, DNAI 1, and ECS option 1 corresponding to FQDN 1 and DNAI 1), and FQDN 3 and ECS option 3 corresponding to FQDN 3 (or FQDN 3, DNAI 1, and ECS option 3 corresponding to FQDN 3 and DNAI 1); and
(d) In FIG. 6, there is no data network whose service scope is larger than that of the data network corresponding to DNAI 3. Therefore, corresponding information cannot be determined based on the foregoing (d). The service scope of the data network is a set of locations of all terminal devices that access the data network.

In response to the terminal device being currently in the service scope of DNAI 1 and the service scope of DNAI 3, after the SMF network element receives request information including FQDN 1 from the first entity, the SMF network element sends, to the first entity, FQDN 1 and ECS option 1 corresponding to FQDN 1 (or FQDN 1, DNAI 1, and ECS option 1 corresponding to FQDN 1 and DNAI 1). In addition, the SMF network element further sends one or more of the following information to the first entity:

(a) FQDN 3 and ECS option 3 corresponding to FQDN 3 (or FQDN 3, DNAI 1, and ECS option 3 corresponding to FQDN 3 and DNAI 1);

(b) FQDN 3 and ECS option 3 corresponding to FQDN 3 (or FQDN 3, DNAI 1, and ECS option 3 corresponding to FQDN 3 and DNAI 1);

(c) In FIG. 6, there is no data network whose service scope is smaller than that of the data network corresponding to DNAI 1. Therefore, corresponding information cannot be determined based on the foregoing (c); and (d) FQDN 4 and ECS option 4 corresponding to FQDN 4 (or FQDN 4, DNAI 3, and ECS option 4 corresponding to FQDN 4 and DNAI 3), and FQDN 5 and ECS option 5 corresponding to FQDN 5 (or FQDN 5, DNAI 3, and ECS option 5 corresponding to FQDN 5 and DNAI 3).

The SMF network element configures or obtains an area corresponding to the DNAI, that is, a service scope of the DNAI. The service scope of the DNAI is a specific location set, for example, a set of one or more of a tracking area (tracking area, TA) 1, a TA 2, . . . ; a RAN_1 and a RAN_2; a cell (Cell)_1 and a Cell_2; or the like. Alternatively, the service scope of the DNAI is a set of pieces of geographical location information, for example, a longitude and a latitude, or an administrative region. Alternatively, the service scope of the DNAI is a set of service scopes of one or more UPF network elements corresponding to the DNAI. The one or more UPF network elements serve the data network. The service scope of the UPF network element is a specific location set or a set of pieces of geographical location information. Alternatively, the service scope of the DNAI is identified by a service scope of an application server (application server, AS) and/or an enabler server (enabler server, ES) deployed on the data network. A representation form of the service scope of the AS or the ES is the same as that described above, and details are not described again. Alternatively, the service scope of the DNAI is a set of locations of terminal devices that access a data network corresponding to the DNAI.

In response to the PDU session being established or the DNAI corresponding to the terminal device changes, the SMF network element sends a second identifier to the first entity. The second identifier is a DNAI corresponding to the current location of the terminal device. The first entity determines the second information based on the first application identification information, the second identifier, and the first information. The first entity first searches for or match first information including the first application identification information from the first information obtained by the SMF network element, and then obtains, from the found or matched first information, the second information corresponding to the first application identification information and the second identifier.

In a case, which information about a terminal device is transmitted is determined by using the PDU session during interaction between the first entity and the SMF network element. In another case, information transmitted between the first entity and the SMF network element and for the terminal device includes an identifier of the terminal device, so that information of a terminal device that is transmitted is determined based on the identifier of the terminal device.

503: The first entity sends DNS request information to a central DNS server or the local DNS resolver based on the second information.

Correspondingly, the central DNS server or the local DNS resolver receives the DNS request information from the first entity. The DNS request information is used to obtain address information of an application server, that is, address information of an application server on which an application corresponding to the first application identification information is deployed.

After the first entity determines the second information based on the first application identification information and the first information obtained from the SMF network element, in response to the second information being the ECS option, the first entity sends the DNS request information to the central DNS server. The DNS request further includes the second information. In a case that the first request information is the DNS request information, compared with the first request information, the DNS request information sent by the first entity to the central DNS server further includes the second information in addition to the first application identification information.

In response to the second information being the address information of the local DNS resolver, the first entity sends the DNS request information to the local DNS resolver. In a case that the first request information is the DNS request information, the DNS request information sent by the first entity to the local DNS resolver is the same as the first request information.

For detailed descriptions of the central DNS server and the local DNS resolver, refer to related descriptions corresponding to FIG. 4.

After the SMF network element sends the first information to the first entity, in response to sensing that the DNAI corresponding to the terminal device changes, the SMF network element sends second indication information and a fourth identifier to the first entity. Correspondingly, the first entity receives the second indication information and the fourth identifier from the SMF network element, and then delete, based on the second indication information, information corresponding to the fourth identifier from the first information. The fourth identifier is a DNAI of a data network that no longer serves the terminal device, and the first identifier includes the fourth identifier. For example, in response to the fourth identifier being DNAI 1 in Table 3, the first entity deletes DNAI 1 from the first information, application identification information corresponding to DNAI 1, and the fourth information.

The SMF network element sends the second indication information, the fourth identifier, and a fifth identifier to the first entity. The fifth identifier is application identification information of an application deployed on a data network corresponding to the fourth identifier. The first entity deletes, based on the second indication information, information corresponding to the fourth identifier and the fifth identifier from the first information. For example, in response to the fourth identifier being DNAI 1 in Table 3, and the fifth identifier is application 1 in Table 3, the first entity deletes information 1 corresponding to DNAI 1 and application 1.

Figure 7:
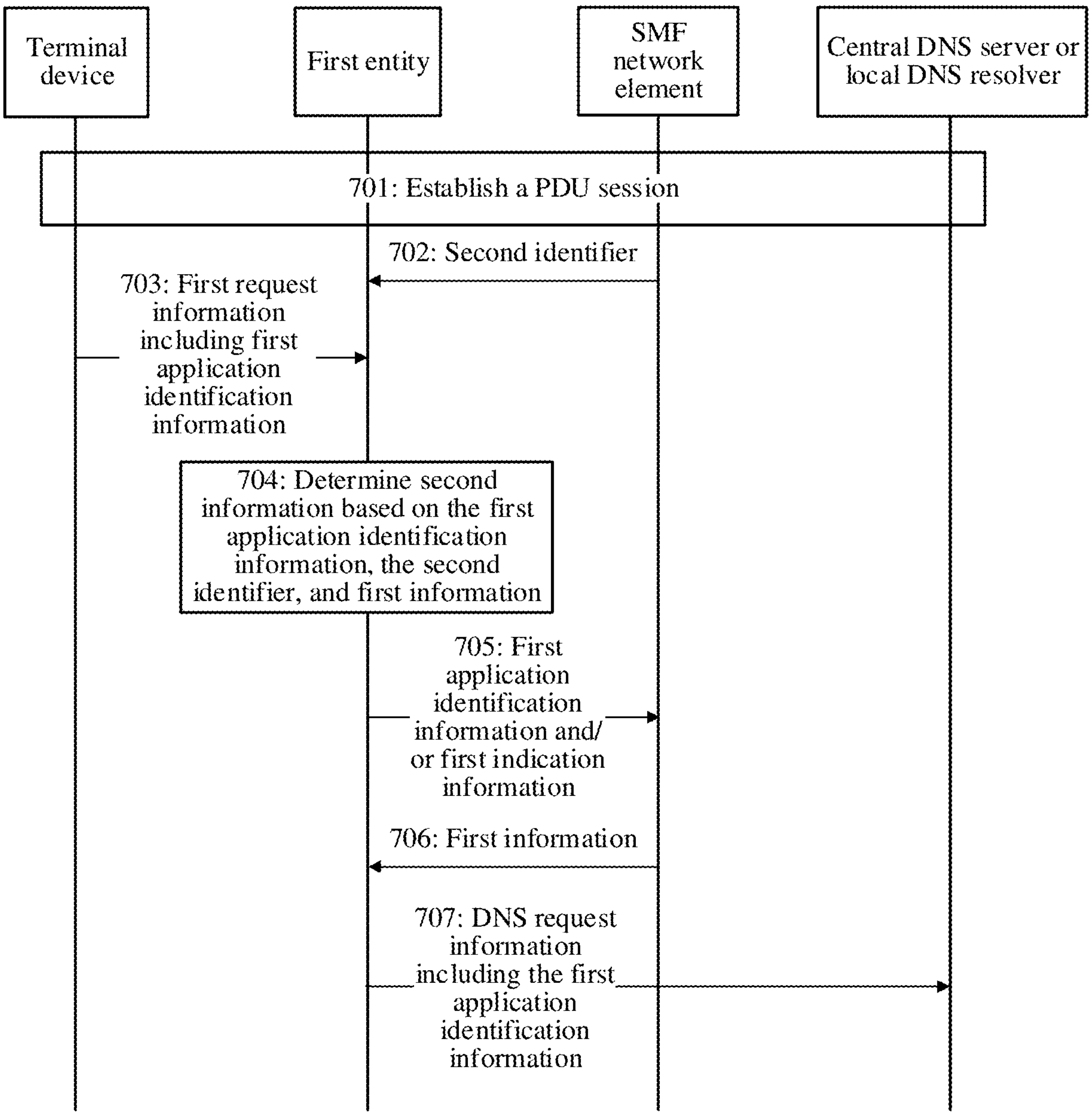
FIG. 7 is a schematic flowchart of another communication method according to at least one embodiment.

Based on the foregoing network architecture, FIG. 7 is a schematic flowchart of another communication method according to at least one embodiment. As shown in FIG. 7, the communication method includes the following steps.

701: A terminal device establishes a PDU session.

702: An SMF network element sends a second identifier to a first entity.

Correspondingly, the first entity receives the second identifier from the SMF network element.

In response to the PDU session associated with the terminal device being established or the SMF network element senses that a DNAI corresponding to the terminal device changes, the SMF network element sends the second identifier to the first entity. That the DNAI corresponding to the terminal device changes means that all or some of the DNAIs corresponding to the terminal device change.

In a case, in response to an MEC deployment status changing, an AF network element sends a notification to the SMF network element. After receiving the notification from the AF network element, the SMF network element senses a current MEC deployment status based on the notification. In another case, the SMF network element senses a current location of the terminal device by using an AMF network element and/or a location management function (location management function, LMF) network element, and then determines a DNAI corresponding to the current location of the terminal device. In other words, a corresponding area includes the DNAI corresponding to the current location of the terminal device. A location of the terminal device is identified by using a TA, a cell ID, or the like.

The SMF network element sends the second identifier to the first entity by using signaling, a message, or the like. For example, in response to the first entity being a UPF network element or is deployed on the UPF network element, the SMF network element sends the second identifier to the first entity by using N4 session modification (Session Modification) signaling. In response to the first entity being an independent network element or device, the SMF network element sends the second identifier to the first entity by using Nsmf_EventExposure_Notify signaling. The foregoing is merely an example used to illustrate that the SMF network element sends the second identifier to the first entity by using signaling, a message, or the like, and does not constitute a limitation thereto.

703: The terminal device sends first request information including first application identification information to the first entity.

Correspondingly, the first entity receives the first request information from the terminal device.

704: The first entity determines second information based on the first application identification information, the second identifier, and first information.

After receiving the first request information from the terminal device, the first entity determines the second information based on the first application identification information, the second identifier, and the first information. In response to the first entity failing to determine the second information, to be specific, the first entity does not include the first information or the existing first information does not include information used for determining the second information, step 705 and step 706 is performed first. In response to the second information being directly received through step 706, the first entity does not perform step 704. In response to the second information not being received through step 706, the first entity further needs to perform step 704 again, and then performs step 707.

705: The first entity sends the first application identification information and/or first indication information to the SMF network element.

Correspondingly, the SMF network element receives the first application identification information and/or the first indication information from the first entity.

In response to the first entity sending the first application identification information and the first indication information to the SMF network element, the first application identification information and the first indication information is sent by using same signaling, a same message, or the like. For example, in response to the first entity being a UPF network element or is deployed on the UPF network element, the first entity sends the first application identification information and the first indication information to the SMF network element by using an N4 report message (report message). In response to the first entity being an independent network element or device, the first entity sends the first application identification information and the first indication information to the SMF network element by using Nsmf_EventExposure_AppRelocationInfo, or first sends an AF request (AFrequest) to a PCF network element, and then the PCF network element sends Npcf_SMPolicyControl_Update Request to the SMF network element. The AF request and the Npcf_SMPolicyControl_Update Request include the first application identification information and the first indication information. In response to sending information to the SMF network element, the first entity directly communicatswith the SMF network element, or communicates with the SMF network element by using another network element or device such as an NEF network element or the PCF network element. The foregoing is merely an example used to illustrate that the first entity sends the first application identification information and the first indication information to the SMF network element by using signaling, a message, or the like, and does not constitute a limitation thereto.

706: The SMF network element sends the first information to the first entity based on the first application identification information and/or the first indication information.

Correspondingly, the first entity receives the first information from the SMF network element.

The SMF network element sends the first information to the first entity by using signaling, a message, or the like. For example, in response to the N4 report message being used in step 704, the SMF network element sends the first information to the first entity by using an N4 report Ack message. In response to the Nsmf_EventExposure_AppRelocationInfo being used in step 704 or the first information is forwarded via the PCF network element, the SMF network element sends the first information to the first entity by using Nsmf_EventExposure_Notify. The foregoing is merely an example used to illustrate that the SMF network element sends the first information to the first entity by using signaling, a message, or the like, and does not constitute a limitation thereto.

The first information sent in step 705 is applicable to all terminal devices that is served by the first entity.

707: The first entity sends DNS request information to a central DNS server or a local DNS resolver based on the second information.

Correspondingly, the central DNS server or the local DNS resolver receives the DNS request information from the first entity.

After the first entity sends the DNS request information to the central DNS server or the local DNS resolver based on the second information, the remaining EAS discovery procedure continues to be performed.

The first entity deletes a part or all of the first information according to a specific condition or rule at any time or triggered by any specific condition. For example, the specific condition or rule is that the deletion is performed periodically, or the remaining storage space is less than a first threshold, or a storage time of information is greater than or equal to a second threshold.

For detailed descriptions of step 701 to step 707, refer to the foregoing related descriptions. Details are not described herein again.

Figure 8:
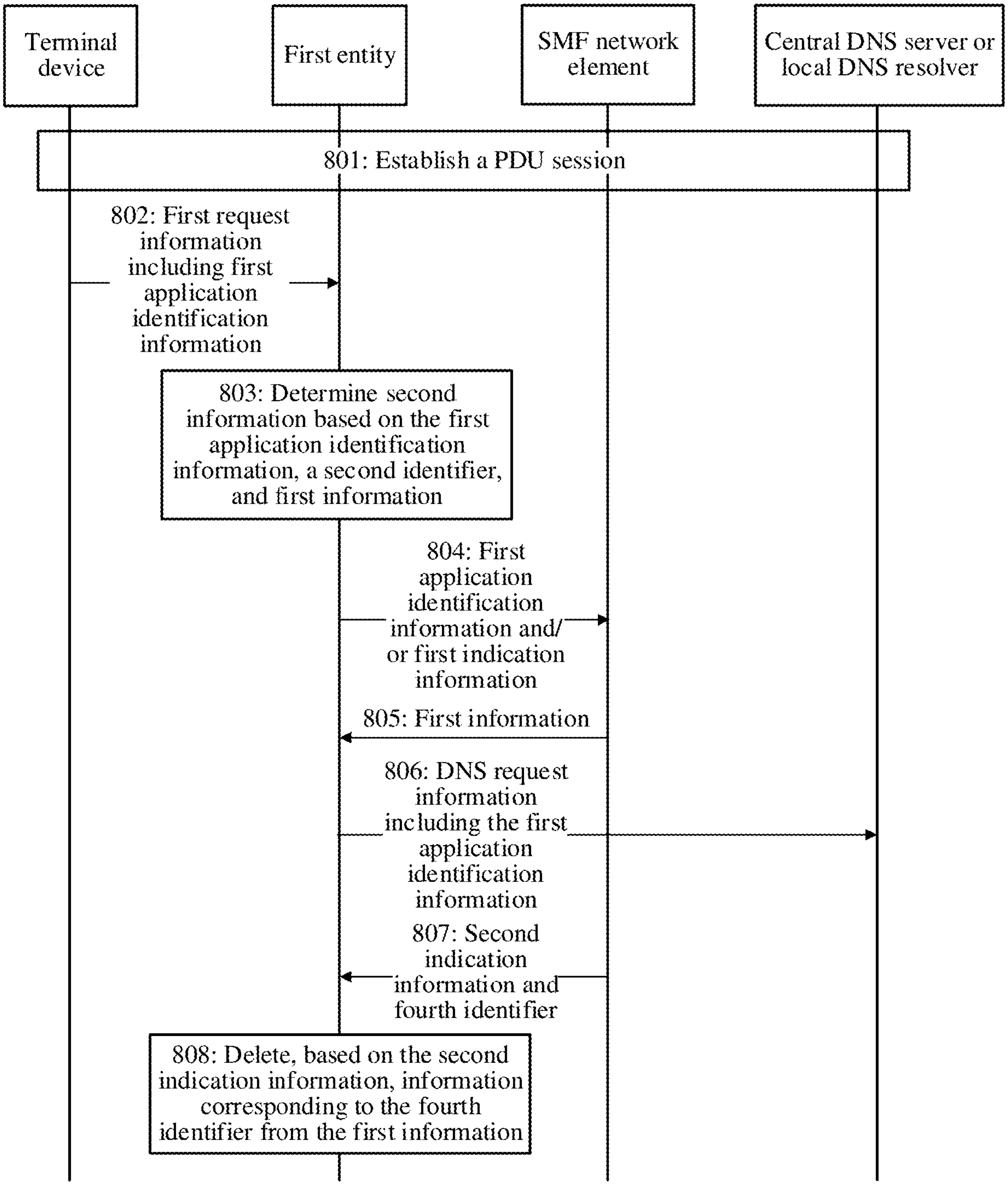
FIG. 8 is a schematic flowchart of still another communication method according to at least one embodiment.

Based on the foregoing network architecture, FIG. 8 is a schematic flowchart of still another communication method according to at least one embodiment. As shown in FIG. 8, the communication method includes the following steps.

801: A terminal device establishes a PDU session.

802: The terminal device sends first request information including first application identification information to a first entity.

Correspondingly, the first entity receives the first request information from the terminal device.

803: The first entity determines second information based on the first application identification information and first information.

After receiving the first request information from the terminal device, the first entity determines the second information based on the first application identification information and the first information. In response to the first entity failing to determine the second information, to be specific, the first entity does not include the first information or the existing first information does not include information used for determining the second information, step 804 and step 805 is performed first. In response to the second information being directly received through step 805, the first entity does not perform step 803. In response to the second information not being received through step 805, the first entity further needs to perform step 803 again.

804: The first entity sends the first application identification information and/or first indication information to an SMF network element.

Correspondingly, the SMF network element receives the first application identification information and/or the first indication information from the first entity.

805: The SMF network element sends the first information to the first entity based on the first application identification information and/or the first indication information.

Correspondingly, the first entity receives the first information from the SMF network element.

The first information sent in step 805 is used as a basis for determining the second information only in response to request information including application identification information being received from the terminal device, and cannot be used as a basis for determining the second information in response to request information including application identification information being received from another terminal device. In other words, the first information serves only a corresponding terminal device, but cannot serve another terminal device. Therefore, after receiving the first information, the first entity establishes a relationship between the first information and the terminal device.

806: The first entity sends DNS request information to a central DNS server or a local DNS resolver based on the second information.

Correspondingly, the central DNS server or the local DNS resolver receives the DNS request information from the first entity.

807: The SMF network element sends second indication information and a fourth identifier to the first entity.

Correspondingly, the first entity receives the second indication information and the fourth identifier from the SMF network element.

In response to sensing that a DNAI corresponding to the terminal device changing, the SMF network element sends the second indication information and the fourth identifier to the first entity, or sends the second indication information, the fourth identifier, and a fifth identifier to the first entity.

Because MEC platform deployment statuses are different, in response to the terminal device being located at a same location, corresponding DNAIs is different for different services. In response to a location of the terminal device not changing but services change, in response to only some services changng, the SMF network element sends the second indication information, the fourth identifier, and the fifth identifier to the first entity. In response to all services changing, the SMF network element sends the second indication information and the fourth identifier to the first entity. Different services correspond to different application identification information.

808: The first entity deletes, based on the second indication information, information corresponding to the fourth identifier from the first information.

The first entity deletes, based on the second indication information, the information corresponding to the fourth identifier from the first information, or deletes, based on the second indication information, information corresponding to the fourth identifier and the fifth identifier from the first information.

For example, in response to the terminal device being in the service scope of DNAI 1 in FIG. 6, in response to the terminal device moving from the service scope of DNAI 1 to the service scope of DNAI 2, because the terminal device is still in the service scope of DNAI 3, the fourth identifier is DNAI 1, and the first entity deletes DNAI 1, an FQDN corresponding to DNAI 1, and an ECS option corresponding to DNAI 1 from the first information corresponding to the terminal device, for example, FQDN 1 and ECS option 1 corresponding to FQDN 1 (or FQDN 1, DNAI 1, and ECS option 1 corresponding to FQDN 1 and DNAI 1), and FQDN 3 and ECS option 3 corresponding to FQDN 3 (or FQDN 3, DNAI 1, and ECS option 3 corresponding to FQDN 3 and DNAI 1).

For detailed descriptions of step 801 to step 808, refer to the foregoing related descriptions. Details are not described herein again.

Figure 9:
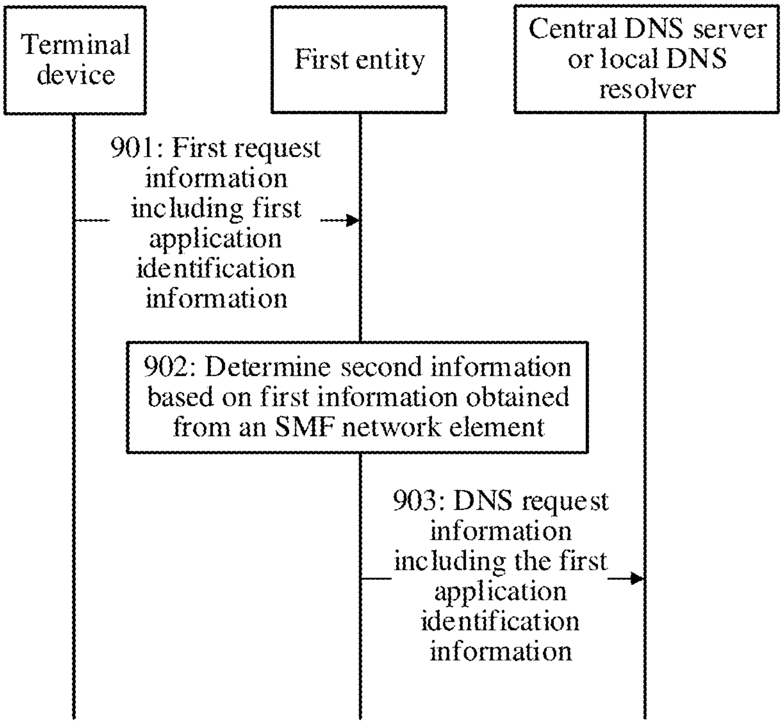
FIG. 9 is a schematic flowchart of still another communication method according to at least one embodiment.

Based on the foregoing network architecture, FIG. 9 is a schematic flowchart of still another communication method according to at least one embodiment. As shown in FIG. 9, the communication method includes the following steps.

901: A terminal device sends first request information including first application identification information to a first entity.

Correspondingly, the first entity receives, from the terminal device, the first request information including the first application identification information.

Step 901 is the same as step 501. For detailed descriptions, refer to step 501.

902: The first entity determines second information based on first information obtained from an SMF network element.

After receiving the first request information from the terminal device, the first entity determines the second information based on the first information obtained from the SMF network element. The second information is an ECS option corresponding to a first identifier or address information of a local DNS resolver corresponding to a first identifier. The first identifier is a DNAI of a data network with a smallest service scope, closest to the terminal device, or that reflects a most accurate location of the terminal device in data networks corresponding to a second identifier. The second identifier is at least one DNAI corresponding to a current location of the terminal device. The first identifier is the DNAI of the data network with a smallest service scope in the data networks corresponding to the second identifier, or is the DNAI of the data network closest to the terminal device, or is the DNAI of the data network that reflects the most accurate location of the terminal device.

In at least one embodiment, the first information includes the second information. The first information includes only the ECS option or the address information of the local domain name system DNS resolver.

In at least one embodiment, the first information includes the first application identification information and the second information corresponding to the first application identification information. The first information further includes a third identifier and third information corresponding to the third identifier. The third identifier is application identification information of an application deployed on a data network corresponding to the second identifier, and the third information is an ECS option corresponding to the third identifier or address information of a local DNS resolver corresponding to the third identifier.

In response to the second information being related only to the first identifier, the first information includes only the ECS option or the address information of the local domain name system DNS resolver. In response to the foregoing assumption not existing, the first information includes application identification information and an ECS option or address information of a local DNS resolver corresponding to the application identification information.

The first information is used only by the terminal device as a basis for determining the second information, and cannot be used by another terminal device.

For other detailed descriptions of step 902, refer to related descriptions in step 502.

903: The first entity sends DNS request information to a central DNS server or the local DNS resolver.

Step 903 is the same as step 503. For detailed descriptions, refer to step 503.

After the SMF network element sends the first information to the first entity, in response to sensing that a first identifier corresponding to the current location of the terminal device changing, the SMF network element sends second indication information to the first entity. Correspondingly, the first entity receives the second indication information from the SMF network element, and then delete the first information based on the second indication information, that is, delete the first information corresponding to the terminal device.

Figure 10:
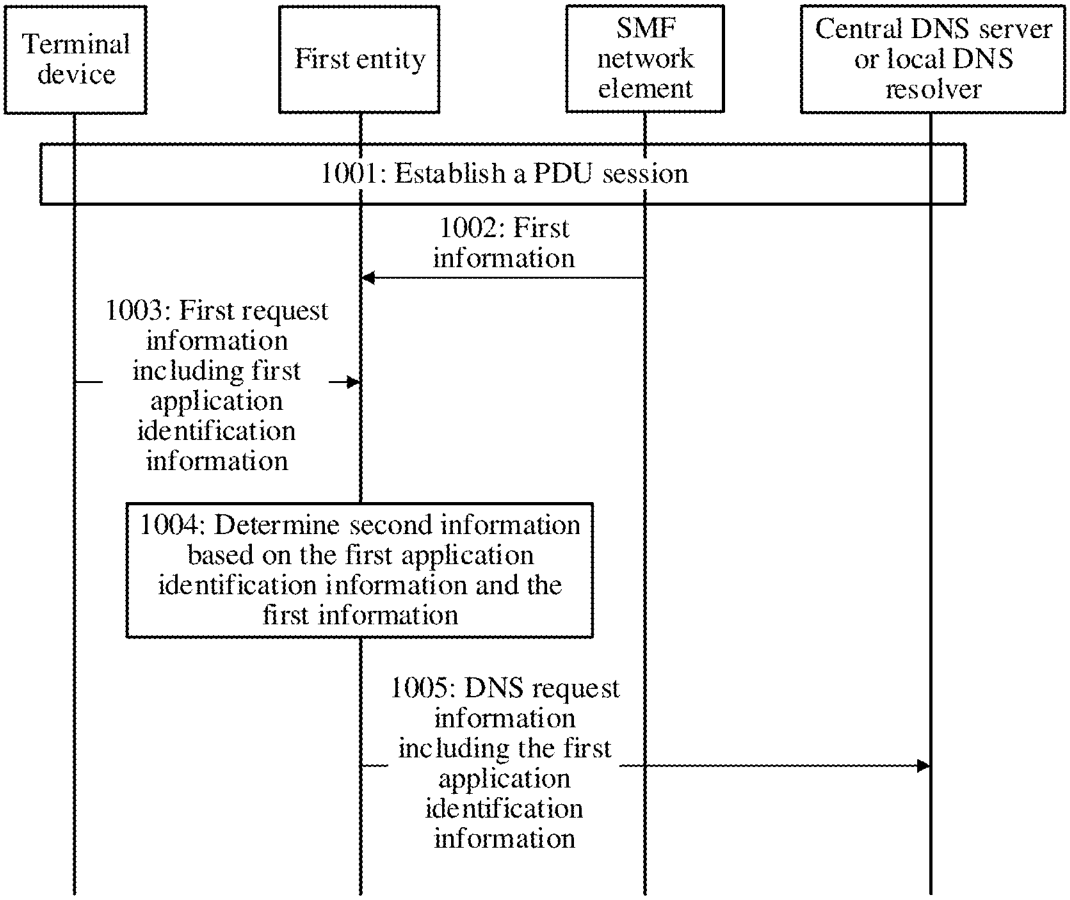
FIG. 10 is a schematic flowchart of still another communication method according to at least one embodiment.

Based on the foregoing network architecture, FIG. 10 is a schematic flowchart of still another communication method according to at least one embodiment. As shown in FIG. 10, the communication method includes the following steps.

1001: A terminal device establishes a PDU session.

1002: An SMF network element sends first information to a first entity.

In at least one embodiment, the first information includes second information. In at least one embodiment, the first information includes first application identification information and the second information corresponding to the first application identification information. The first information further includes a third identifier and third information corresponding to the third identifier. The third identifier is application identification information of an application deployed on a data network corresponding to a second identifier, and the third information is an ECS option corresponding to the third identifier or address information of a local DNS resolver corresponding to the third identifier. For detailed descriptions of the first information, refer to related descriptions in step 902.

Step 1002 is similar to step 702. For detailed descriptions, refer to step 702. A difference lies in that: in step 702, sending is performed in response to changing of the DNAI corresponding to the terminal device being sensed, while in step 1002, sending is performed in response to changing of a first identifier corresponding to a current location of the terminal device being sensed.

For example, in response to the terminal device moving from the service scope of DNAI 1 to the service scope of DNAI 2 in FIG. 6, and DNAI 2 is a DNAI of a data network with a smallest service scope, closest to the terminal device, or that reflects a most accurate location of the terminal device in DNAIs corresponding to the terminal device, the SMF network element sends ECS option 2 (or FQDN 2 and ECS option 2 corresponding to FQDN 2) to the first entity. In response to the SMF network element sending FQDN 2 and ECS option 2 corresponding to FQDN 2 to the first entity, the SMF network element further sends, to the first entity, FQDN 3 and ECS option 3' corresponding to FQDN 3, FQDN 4 and ECS option 4 corresponding to FQDN 4, and FQDN 3 and ECS option 5 corresponding to FQDN 3.

In response to the foregoing assumption being met, and second information corresponding to DNAI 1 and DNAI 2 is the same, in response to the SMF network element sensing that the first identifier corresponding to the current location of the terminal device changes from DNAI 1 to DNAI 2, because first information existing in the first entity is the same as the first information to be sent, the SMF network element does not repeatedly send the first information to the first entity, so that unnecessary information transmission is reduced, thereby saving transmission resources.

In response to the foregoing assumption not being met, and applications deployed on data networks corresponding to DNAI 1 and DNAI 2 are the same, and second information corresponding to each of the applications is also the same, in response to the SMF network element sensing that the first identifier corresponding to the current location of the terminal device changes from DNAI 1 to DNAI 2, because first information existing in the first entity is the same as the first information to be sent, the SMF network element does not repeatedly send the first information to the first entity, so that unnecessary information transmission is reduced, thereby saving transmission resources.

In addition, service subscription information of the terminal device is alternatively considered, and the first information is determined based on an edge service that is subscribed to by the terminal device and that is in the service subscription information, in other words, the first information is determined based on application identification information in the service subscription information of the terminal device.

The first information is used only by the terminal device as a basis for determining the second information, and cannot be used by another terminal device.

1003: The terminal device sends first request information including the first application identification information to the first entity.

Correspondingly, the first entity receives the first request information from the terminal device.

1004: The first entity determines the second information based on the first application identification information and the first information.

After receiving the first request information from the terminal device, the first entity determines the second information based on first information latest obtained from the first information that is of the terminal device and that is received from the SMF network element and the first application identification information. The second information is an ECS option corresponding to a first identifier or address information of a local DNS resolver corresponding to a first identifier. The first identifier is a DNAI of a data network with a smallest service scope, closest to the terminal device, or that reflects a most accurate location of the terminal device in data networks corresponding to a second identifier. The second identifier is at least one DNAI corresponding to the current location of the terminal device.

1005: The first entity sends DNS request information to a central DNS server or the local DNS resolver based on the second information.

Correspondingly, the central DNS server or the local DNS resolver receives the DNS request information from the first entity.

Step 1005 is similar to step 707. For detailed descriptions, refer to step 707.

For detailed descriptions of step 1001 to step 1005, refer to the foregoing related descriptions. Details are not described herein again.

Figure 11:
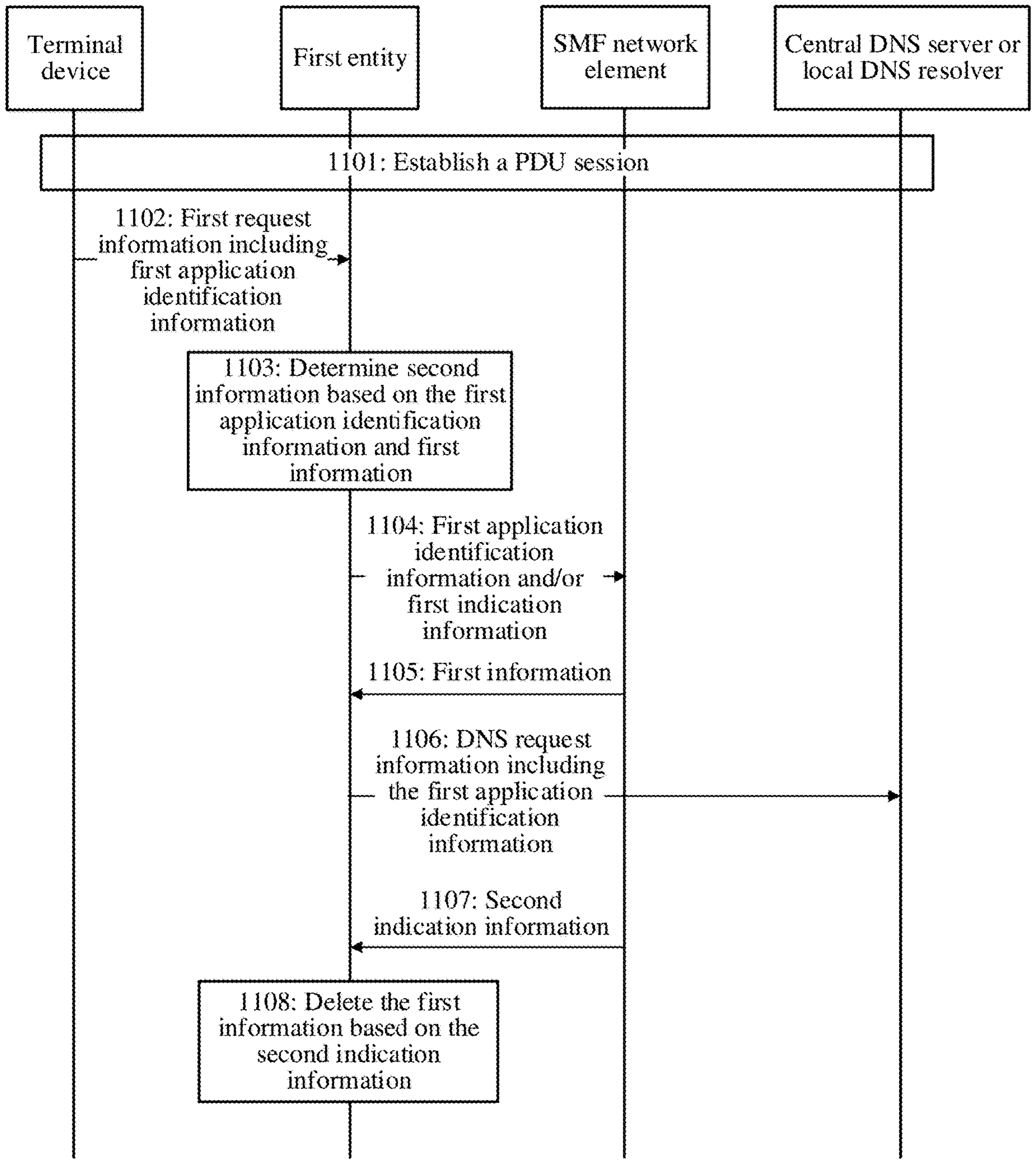
FIG. 11 is a schematic flowchart of still another communication method according to at least one embodiment.

Based on the foregoing network architecture, FIG. 11 is a schematic flowchart of still another communication method according to at least one embodiment. As shown in FIG. 11, the communication method includes the following steps.

1101: A terminal device establishes a PDU session.

1102: The terminal device sends first request information including first application identification information to a first entity.

Correspondingly, the first entity receives the first request information from the terminal device.

1103: The first entity determines second information based on the first application identification information and first information.

The second information is an ECS option corresponding to a first identifier or address information of a local DNS resolver corresponding to a first identifier. The first identifier is a DNAI of a data network with a smallest service scope, closest to the terminal device, or that reflects a most accurate location of the terminal device in data networks corresponding to a second identifier. The second identifier is at least one DNAI corresponding to a current location of the terminal device.

After receiving the first request information from the terminal device, the first entity determines the second information based on the first application identification information and the first information. In response to the first entity failing to determine the second information, to be specific, the first entity does not include the first information or the existing first information does not include information used for determining the second information, step 1104 and step 1105 is performed first. In response to the second information being directly received through step 1105, the first entity does not perform step 1103. In response to the second information not being received through step 1105, the first entity further needs to perform step 1103 again.

1104: The first entity sends the first application identification information and/or first indication information to the SMF network element.

Correspondingly, the SMF network element receives the first application identification information and/or the first indication information from the first entity.

1105: The SMF network element sends the first information to the first entity based on the first application identification information and/or the first indication information.

Correspondingly, the first entity receives the first information from the SMF network element.

The first information sent in step 1105 is useful only for the terminal device, and is useless for another terminal device. Therefore, after receiving the first information, the first entity establishes a relationship between the first information and the terminal device.

In at least one embodiment, the first information includes the second information. In at least one embodiment, the first information includes the first application identification information and the second information corresponding to the first application identification information. The first information further includes a third identifier and third information corresponding to the third identifier. The third identifier is application identification information of an application deployed on a data network corresponding to the second identifier, and the third information is an ECS option corresponding to the third identifier address information of a local DNS resolver corresponding to the third identifier.

1106: The first entity sends DNS request information to a central DNS server or the local DNS resolver based on the second information.

Correspondingly, the central DNS server or the local DNS resolver receives the DNS request information from the first entity.

1107: The SMF network element sends second indication information to the first entity.

Correspondingly, the first entity receives the second indication information from the SMF network element.

In response to sensing that a first identifier corresponding to the terminal device changing, the SMF network element sends the second indication information to the first entity.

1108: The first entity deletes the first information based on the second indication information.

The first entity deletes the first information based on the second indication information, that is, delete the first information corresponding to the terminal device.

For detailed descriptions of step 1101 to step 1108, refer to the foregoing related descriptions. Details are not described herein again.

In the communication method, a function performed by the terminal device is alternatively performed by a module (for example, a chip) in the terminal device, a function performed by the first entity is alternatively performed by a module (for example, a chip) in the first entity, a function performed by the SMF network element is alternatively performed by a module (for example, a chip) in the SMF network element, and a function performed by the DNS server is alternatively performed by a module (for example, a chip) in the DNS server, a function performed by the DNS resolver is alternatively performed by a module (for example, a chip) in the DNS resolver.

The SMF network element in the communication method is replaced with another mobile network control plane network element or device.

Related information in the foregoing different embodiments is mutually referenced.

Figure 12:
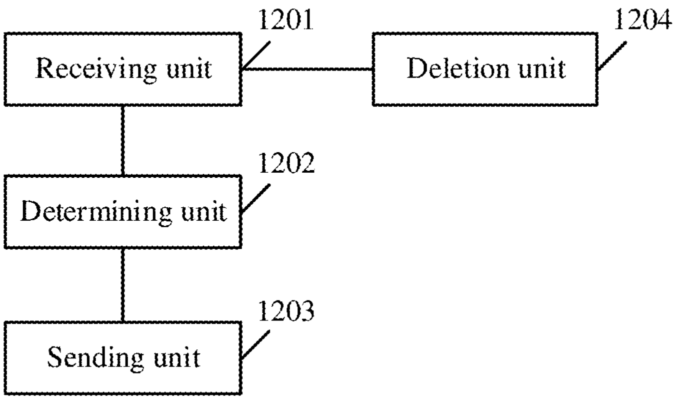
FIG. 12 is a schematic diagram of a structure of a communication apparatus according to at least one embodiment.

Based on the foregoing network architecture, FIG. 12 is a schematic diagram of a structure of a communication apparatus according to at least one embodiment. As shown in FIG. 12, the communication apparatus includes:

a receiving unit 1201, configured to receive first request information from a terminal device, where the first request information includes first application identification information;

a determining unit 1202, configured to determine second information based on the first application identification information and first information obtained from a session network function network element, where the second information is an ECS option or address information of a local DNS resolver; and a sending unit 1203, configured to send DNS request information to a central DNS server or the local DNS resolver based on the second information, where the DNS request information includes the first application identification information, and the DNS request information is used to obtain address information of an application server.

In an embodiment, the receiving unit 1201 is further configured to receive the first information from the session management function network element, where the first information includes the first application identification information and the second information corresponding to the first application identification information.

In an embodiment, the receiving unit 1201 is further configured to receive the first information from the session management function network element, where the first information includes the first application identification information, a first identifier, and the second information corresponding to the first application identification information and the first identifier, and the first identifier is at least one data network access identifier.

In an embodiment, the receiving unit 1201 is further configured to receive a second identifier from the session management function network element, where the second identifier is a data network access identifier corresponding to a current location of the terminal device.

The determining unit 1202 is specifically configured to determine the second information based on the first application identification information, the second identifier, and the first information obtained from the session network function network element.

In an embodiment, the sending unit 1203 is further configured to: before the receiving unit receives the first information from the session management function network element, send the first application identification information and/or first indication information to the session management function network element, where the first application identification information is used to obtain the first information, and the first indication information indicates the session management function network element to send the first information.

In an embodiment, the first information further includes a third identifier, the first identifier, and third information corresponding to the first identifier and the third identifier. The third identifier is application identification information of an application deployed on a data network corresponding to the first identifier. The third information is an ECS option corresponding to the third identifier or address information of a local DNS resolver corresponding to the third identifier.

In an embodiment, the first information further includes a third identifier and third information corresponding to the third identifier. The third identifier is application identification information of an application deployed on a data network corresponding to the first identifier. The third information is an ECS option corresponding to the third identifier or address information of a local DNS resolver corresponding to the third identifier.

In an embodiment, the receiving unit 1201 is further configured to receive second indication information and a fourth identifier from the session management function network element, where the fourth identifier is a data network access identifier of a data network that no longer serves the terminal device, and the first identifier includes the fourth identifier.

The communication apparatus further includes:

a deletion unit 1204, configured to delete, based on the second indication information, information corresponding to the fourth identifier from the first information.

In an embodiment, that the receiving unit 1201 receives second indication information and a fourth identifier from the session management function network element includes:

receiving the second indication information, the fourth identifier, and a fifth identifier from the session management function network element, where the fifth identifier is application identification information of an application deployed on a data network corresponding to the fourth identifier.

The deletion unit 1204 is specifically configured to delete information corresponding to the fourth identifier and the fifth identifier from the first information.

In an embodiment, that the sending unit 1203 sends DNS request information to a central DNS server or the local DNS resolver based on the second information includes:

in response to the second information being the ECS option, sending the DNS request information to the central DNS server, where the DNS request further includes the second information; or in response to the second information being the address information of the local DNS resolver, sending the DNS request information to the local DNS resolver.

For more detailed descriptions of the receiving unit 1201, the determining unit 1202, the sending unit 1203, and the deletion unit 1204, directly refer to related descriptions of the first entity in the method embodiments shown in FIG. 5, FIG. 7, and FIG. 8. Details are not described herein again.

Figure 13:
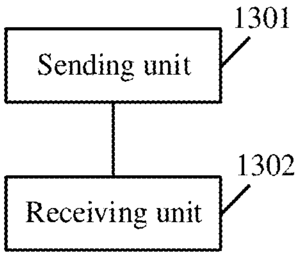
FIG. 13 is a schematic diagram of a structure of another communication apparatus according to at least one embodiment.

Based on the foregoing network architecture, FIG. 13 is a schematic diagram of a structure of another communication apparatus according to at least one embodiment. As shown in FIG. 13, the communication apparatus includes:

a sending unit 1301, configured to send first information to a first entity, where the first information includes first application identification information and second information corresponding to the first application identification information, or includes first application identification information, a first identifier, and second information corresponding to the first application identification information and the first identifier, where the first identifier is at least one data network access identifier, the second information is an ECS option or address information of a local DNS resolver, and the first information is used by the first entity to determine the second information.

In an embodiment, the sending unit 1301 is further configured to send a second identifier to the first entity, where the second identifier is a data network access identifier corresponding to a current location of a terminal device.

That the first information is used to determine the second information includes:

the first information and the second identifier are used to determine the second information.

In an embodiment, the communication apparatus further includes:

a receiving unit 1302, configured to receive the first application identification information and/or first indication information from the first entity.

That the sending unit 1301 sends first information to a first entity includes:

sending the first information to the first entity based on the first application identification information and/or the first indication information.

In an embodiment, the first information further includes a third identifier, the first identifier, and third information corresponding to the first identifier and the third identifier. The third identifier is application identification information of an application deployed on a data network corresponding to the first identifier. The third information is an ECS option corresponding to the third identifier or address information of a local DNS resolver corresponding to the third identifier.

In an embodiment, the first information further includes a third identifier and third information corresponding to the third identifier. The third identifier is application identification information of an application deployed on a data network corresponding to the first identifier. The third information is a client subnet option corresponding to the third identifier or address information of a local DNS resolver corresponding to the third identifier.

In an embodiment, the sending unit 1301 is further configured to send second indication information and a fourth identifier to the first entity, where the fourth identifier is a data network access identifier of a data network that no longer serves the terminal device, the first identifier includes the fourth identifier, and the second indication information is used to delete information corresponding to the fourth identifier from the first information.

In an embodiment, that the sending unit 1301 sends second indication information and a fourth identifier to the first entity includes:

sending the second indication information, the fourth identifier, and a fifth identifier to the first entity, where the fifth identifier is application identification information of an application deployed on a data network corresponding to the fourth identifier.

That the second indication information is used to delete information corresponding to the fourth identifier from the first information includes:

the second indication information is used to delete information corresponding to the fourth identifier and the fifth identifier from the first information.

For more detailed descriptions of the sending unit 1301 and the receiving unit 1302, directly refer to related descriptions of the SMF network element in the method embodiments shown in FIG. 5, FIG. 7, and FIG. 8. Details are not described herein again.

Figure 14:
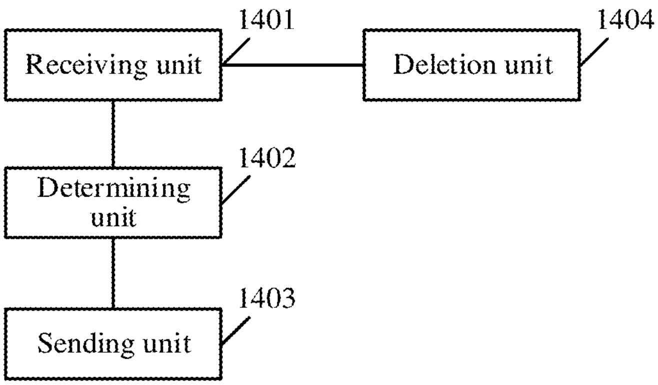
FIG. 14 is a schematic diagram of a structure of still another communication apparatus according to at least one embodiment.

Based on the foregoing network architecture, FIG. 14 is a schematic diagram of a structure of still another communication apparatus according to at least one embodiment. As shown in FIG. 14, the communication apparatus includes:

a receiving unit 1401, configured to receive first request information from a terminal device, where the first request information includes first application identification information;

a determining unit 1402, configured to determine second information based on first information obtained from a session management function network element, where the second information is an ECS option corresponding to a first identifier or address information of a local DNS resolver corresponding to a first identifier, the first identifier is a data network access identifier of a data network with a smallest service scope or closest to the terminal device in data networks corresponding to a second identifier, and the second identifier is at least one data network access identifier corresponding to a current location of the terminal device; and a sending unit 1403, configured to send DNS request information to a central DNS server or the local DNS resolver based on the second information, where the DNS request information includes the first application identification information, and the DNS request information is used to obtain address information of an application server.

In an embodiment, the receiving unit 1401 is further configured to receive the first information from the session management function network element, where the first information includes the second information.

In an embodiment, the receiving unit 1401 is further configured to receive the first information from the session management function network element, where the first information includes the first application identification information and the second information corresponding to the first application identification information.

In an embodiment, the first information further includes a third identifier and third information corresponding to the third identifier. The third identifier is application identification information of an application deployed on a data network corresponding to the second identifier. The third information is an ECS option corresponding to the third identifier or address information of a local DNS resolver corresponding to the third identifier.

In an embodiment, the sending unit 1403 is further configured to send the first application identification information and/or first indication information to the session management function network element, where the first application identification information is used to obtain the first information, and the first indication information indicates the session management function network element to send the first information.

In an embodiment, the receiving unit 1401 is further configured to receive second indication information from the session management function network element, where the second indication information indicates to delete the first information.

The communication apparatus further includes:

a deletion unit 1404, configured to delete the first information based on the second indication information.

In an embodiment, that the sending unit 1403 sends DNS request information to a central DNS server or the local DNS resolver based on the second information includes:

in response to the second information being the ECS option, sending the DNS request information to the central DNS server, where the DNS request further includes the second information; or in response to the second information being the address information of the local DNS resolver, sending the DNS request information to the local DNS resolver.

For more detailed descriptions of the receiving unit 1401, the determining unit 1402, the sending unit 1403, and the deletion unit 1404, directly refer to related descriptions of the first entity in the method embodiments shown in FIG. 9 to FIG. 11. Details are not described herein again.

Figure 15:
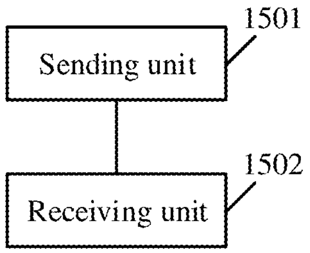
FIG. 15 is a schematic diagram of a structure of still another communication apparatus according to at least one embodiment.

Based on the foregoing network architecture, FIG. 15 is a schematic diagram of a structure of still another communication apparatus according to at least one embodiment. As shown in FIG. 15, the communication apparatus includes:

a sending unit 1501, configured to send first information to a first entity, where the first information includes second information, or includes first application identification information and second information corresponding to the first application identification information, the second information is an ECS option corresponding to a first identifier or address information of a local DNS resolver corresponding to a first identifier, the first identifier is a data network access identifier of a data network with a smallest service scope or closest to a terminal device in data networks corresponding to a second identifier, the second identifier is at least one data network access identifier corresponding to a current location of the terminal device, and the first information is used to determine the second information.

In an embodiment, the first information further includes a third identifier and third information corresponding to the third identifier. The third identifier is application identification information of an application deployed on a data network corresponding to the second identifier. The third information is an ECS option corresponding to the third identifier or address information of a local DNS resolver corresponding to the third identifier.

In an embodiment, the communication apparatus further includes:

a receiving unit 1502, configured to receive the first application identification information and/or first indication information from the first entity.

The sending unit 1501 is specifically configured to send the first information to the first entity based on the first application identification information and/or the first indication information.

In an embodiment, the sending unit 1501 is further configured to send second indication information to the first entity, where the second indication information indicates to delete the first information.

For more detailed descriptions of the sending unit 1501 and the receiving unit 1502, directly refer to related descriptions of the SMF network element in the method embodiments shown in FIG. 9 to FIG. 11. Details are not described herein again.

Figure 16:
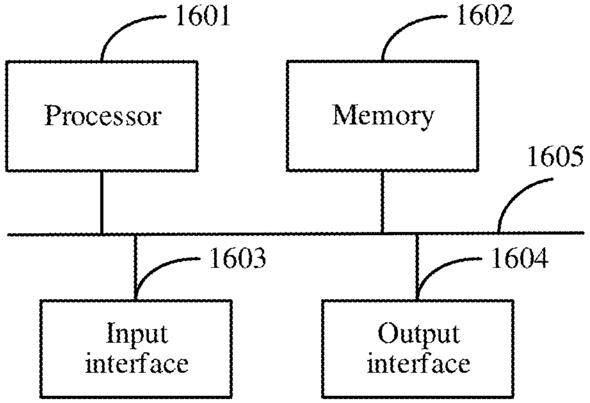
FIG. 16 is a schematic diagram of a structure of still another communication apparatus according to at least one embodiment.

Based on the foregoing network architecture, FIG. 16 is a schematic diagram of a structure of still another communication apparatus according to at least one embodiment. As shown in FIG. 16, the communication apparatus includes a processor 1601, a memory 1602, an input interface 1603, an output interface 1604, and a bus 1605. The memory 1602 exists independently, and is connected to the processor 1601 through the bus 1605. Alternatively, the memory 1602 is integrated with the processor 1601. The bus 1605 is configured to connect these components.

In an embodiment, the communication apparatus is a first entity or a module (for example, a chip) in the first entity. In response to computer program instructions stored in the memory 1602 being executed, the processor 1601 is configured to control the receiving unit 1201 and the sending unit 1203 to perform the operations performed in the foregoing embodiment. The processor 1601 is further configured to perform the operations performed by the determining unit 1202 and the deletion unit 1204 in the foregoing embodiment. The input interface 1603 is configured to perform the operations performed by the receiving unit 1201 in the foregoing embodiment. The output interface 1604 is configured to perform the operations performed by the sending unit 1203 in the foregoing embodiment. The first entity or the module in the first entity is further configured to perform various methods performed by the first entity in the method embodiments in FIG. 5, FIG. 7, and FIG. 8. Details are not described again.

In an embodiment, the communication apparatus is an SMF network element or a module (for example, a chip) in the SMF network element. In response to computer program instructions stored in the memory 1602 being executed, the processor 1601 is configured to control the sending unit 1301 and the receiving unit 1302 to perform the operations performed in the foregoing embodiment. The input interface 1603 is configured to perform the operations performed by the receiving unit 1302 in the foregoing embodiment. The output interface 1604 is configured to perform the operations performed by the sending unit 1301 in the foregoing embodiment. The SMF network element or the module in the SMF network element is further configured to perform various methods performed by the SMF network element in the method embodiments in FIG. 5, FIG. 7, and FIG. 8. Details are not described again.

In an embodiment, the communication apparatus is a first entity or a module (for example, a chip) in the first entity. In response to computer program instructions stored in the memory 1602 being executed, the processor 1601 is configured to control the receiving unit 1401 and the sending unit 1403 to perform the operations performed in the foregoing embodiment. The processor 1601 is further configured to perform the operations performed by the determining unit 1402 and the deletion unit 1404 in the foregoing embodiment. The input interface 1603 is configured to perform the operations performed by the receiving unit 1401 in the foregoing embodiment. The output interface 1604 is configured to perform the operations performed by the sending unit 1403 in the foregoing embodiment. The first entity or the module in the first entity is further configured to perform various methods performed by the first entity in the method embodiments in FIG. 9 to FIG. 11. Details are not described again.

In an embodiment, the communication apparatus is an SMF network element or a module (for example, a chip) in the SMF network element. In response to computer program instructions stored in the memory 1602 being executed, the processor 1601 is configured to control the sending unit 1501 and the receiving unit 1502 to perform the operations performed in the foregoing embodiment. The input interface 1603 is configured to perform the operations performed by the receiving unit 1502 in the foregoing embodiment. The output interface 1604 is configured to perform the operations performed by the sending unit 1501 in the foregoing embodiment. The SMF network element or the module in the SMF network element is further configured to perform various methods performed by the SMF network element in the method embodiments in FIG. 9 to FIG. 11. Details are not described again.

Figure 17:
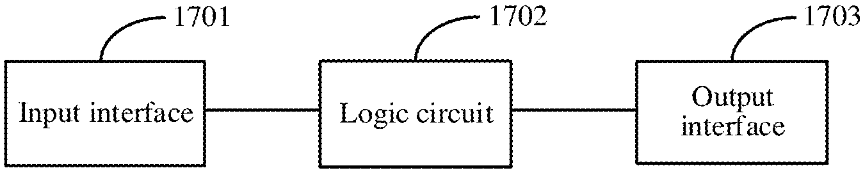
FIG. 17 is a schematic diagram of a structure of still another communication apparatus according to at least one embodiment.

Based on the foregoing network architecture, FIG. 17 is a schematic diagram of a structure of still another communication apparatus according to at least one embodiment. As shown in FIG. 17, the communication apparatus includes an input interface 1701, a logic circuit 1702, and an output interface 1703. The input interface 1701 is connected to the output interface 1703 via the logic circuit 1702. The input interface 1701 is configured to receive information from another communication apparatus, and the output interface 1703 is configured to output, schedule, or send information to the another communication apparatus. The logic circuit 1702 is configured to perform an operation other than operations of the input interface 1701 and the output interface 1703, for example, implement a function implemented by the processor 1601 in the foregoing embodiment. The communication apparatus is a network device or a module of the network device, or is a first terminal device or a module of the first terminal device, or is a second terminal device or a module of the second terminal device. For more detailed descriptions of the input interface 1701, the logic circuit 1702, and the output interface 1703, directly refer to related descriptions of the first entity and the SMF network element in the foregoing method embodiments. Details are not described herein again.

At least one embodiment further includes a computer-readable storage medium storing instructions. In response to the instructions being executed, the method in the foregoing method embodiments is performed.

At least one embodiment further includes a computer program product including instructions. In response to the instructions are executed, the method in the foregoing method embodiments is performed.

At least one embodiment further includes a communication system. The communication system includes a network device, a first terminal device, and a second terminal device. For specific descriptions, refer to the communication methods shown in FIG. 5 and FIG. 7 to FIG. 11.

In the foregoing embodiments, the objectives, technical solutions, and beneficial effects are further described in detail. The foregoing descriptions are merely specific implementations, but are not intended to limit the protection scope of embodiments described herein. Any modification, equivalent replacement, improvement, or the like made based on the technical solutions fall within the protection scope of at least one embodiment.

What is claimed is:

1. A communication method, comprising:

receiving, by a first entity, first request information from a terminal device, wherein the first request information includes first application identification information;

determining, by the first entity, second information based on first information from a session management function network element, wherein the second information includes extended mechanisms for domain name system (DNS) client subnet option corresponding to a first identifier, wherein the first identifier is a data network access identifier of a data network, in data networks corresponding to a second identifier, closest to the terminal device, and the second identifier includes at least one data network access identifier corresponding to a current location of the terminal device; and sending, by the first entity, DNS request information to a central DNS server based on the second information, wherein the DNS request information includes the first application identification information, and the DNS request information is usable to obtain address information of an application server, wherein the method further comprises:

receiving, by the first entity, second indication information sent from the session management function network element in response to sensing that the first identifier which is the data network access identifier of the data network closest to the terminal device changes, wherein the second indication information indicates to delete the first information; and deleting, by the first entity, the first information based on the second indication information.

2. The method according to claim 1, wherein the method further comprises:

receiving, by the first entity, the first information from the session management function network element, wherein the first information includes the second information.

3. The method according to claim 2, wherein the method further comprises:

sending, by the first entity, the first application identification information to the session management function network element, wherein the first application identification information is useable to obtain the first information.

4. The method according to claim 1, wherein the DNS request information further includes the second information.

5. The method according to claim 1, further comprising:

sending, by the session management function network element, the first information to the first entity.

6. The method according to claim 5, wherein the first information further includes a third identifier and third information corresponding to the third identifier, the third identifier includes application identification information of an application deployed on a data network corresponding to the second identifier, and the third information includes an extended mechanism for DNS client subnet option corresponding to the third identifier.

7. The method according to claim 5, wherein the method further comprises:

sending, by the first entity, the first application identification information to the session management function network element; and receiving, by the session management function network element, the first application identification information from the first entity; and the sending the first information to the first entity includes:

sending the first information to the first entity based on the first application identification information received from the first entity.

8. The method according to claim 1, wherein the method further comprises:

receiving, by the first entity, fourth identifier from the session management function network element, wherein the fourth identifier is a data network access identifier of, among the data networks corresponding to the second identifier, a data network that no longer serves the terminal device, and the first identifier includes the fourth identifier; and deleting, by the first entity and based on the second indication information, information corresponding to the fourth identifier from the first information.

9. A communication apparatus, comprising:

a memory storing instructions; and a processor connected to the memory, wherein the processor is configured to execute the instructions to perform operations for:

receiving first request information from a terminal device, wherein the first request information includes first application identification information;

determining second information based on first information from a session management function network element, wherein the second information includes extended mechanisms for domain name system (DNS) client subnet option corresponding to a first identifier, wherein the first identifier is a data network access identifier of a data network, in data networks corresponding to a second identifier, closest to the terminal device, and the second identifier includes at least one data network access identifier corresponding to a current location of the terminal device; and sending DNS request information to a central DNS server based on the second information, wherein the DNS request information includes the first application identification information, and the DNS request information is useable to obtain address information of an application server, wherein the processor is further configured to execute the instructions to perform operations for:

receiving second indication information and a fourth identifier from the session management function network element, wherein the fourth identifier is a data network access identifier of, among the data networks corresponding to the second identifier, a data network that no longer serves the terminal device, and the first identifier includes the fourth identifier; and deleting, based on the second indication information, information corresponding to the fourth identifier from the first information.

10. The communication apparatus according to claim 9, wherein the processor is further configured to execute the instructions to perform operations for:

receiving the first information from the session management function network element, wherein the first information includes the second information.

11. The communication apparatus according to claim 10, wherein the processor is further configured to execute the instructions to perform operations for:

sending the first application identification information to the session management function network element, wherein the first application identification information is useable to obtain the first information.

12. The communication apparatus according to claim 9, wherein the DNS request information further includes the second information.

13. The communication apparatus according to claim 9, wherein the second indication information is sent from the session management function network element in response to sensing that the first identifier which is the data network access identifier of the data network closest to the terminal device changes, and the second indication information indicates to delete the first information; and the processor is further configured to execute the instructions to perform operations for deleting the first information based on the second indication information.

14. A system, comprising:

a first entity comprising a first processor; and a session management function network element comprising a second processor, wherein the first processor is configured to execute instructions to perform operations for:

receiving first request information from a terminal device, wherein the first request information includes first application identification information;

determining second information based on first information from the session management function network element, wherein the second information includes extended mechanisms for domain name system (DNS) client subnet option corresponding to a first identifier, wherein the first identifier is a data network access identifier of a data network, in data networks corresponding to a second identifier, closest to the terminal device, and the second identifier includes at least one data network access identifier corresponding to a current location of the terminal device; and sending DNS request information to a central DNS server based on the second information, wherein the DNS request information includes the first application identification information, and the DNS request information is useable to obtain address information of an application server; and the second processor is configured to execute instructions to perform operations for:

sending the first information to the first entity, wherein the second processor is configured to execute instructions to perform operations for:

sending second indication information to the first entity, in response to sensing that the first identifier which is the data network access identifier of the data network closest to the terminal device changes, wherein the second indication information indicates to delete the first information; and the first processor is configured to execute instructions to perform operations for:

receiving the second indication information from the session management function network element; and deleting the first information based on the second indication information.

15. The system according to claim 14, wherein the first information includes the second information.

16. The system according to claim 14, wherein the first processor is configured to execute instructions to perform operations for:

sending the first application identification information to the session management function network element;

the second processor is configured to execute instructions to perform operations for:

receiving the first application identification information from the first entity; and the sending the first information to the first entity includes:

sending the first information to the first entity based on the first application identification information received from the first entity.

17. The system according to claim 14, wherein the DNS request information further includes the second information.

* * * * *